US012475267B2

(12) United States Patent
Zhang

(10) Patent No.: US 12,475,267 B2
(45) Date of Patent: Nov. 18, 2025

(54) INFORMATION PROCESSING METHOD AND APPARATUS FOR OBTAINING A DISPLAY RESULT BY A TERMINAL DEVICE

(71) Applicant: Honor Device Co., Ltd., Shenzhen (CN)

(72) Inventor: Peng Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/038,568

(22) PCT Filed: Dec. 13, 2022

(86) PCT No.: PCT/CN2022/138807
§ 371 (c)(1),
(2) Date: May 24, 2023

(87) PCT Pub. No.: WO2023/134376
PCT Pub. Date: Jul. 20, 2023

(65) Prior Publication Data
US 2024/0354450 A1    Oct. 24, 2024

(30) Foreign Application Priority Data
Jan. 17, 2022   (CN) .......................... 202210051809.1

(51) Int. Cl.
*G06F 21/53*   (2013.01)
*G06F 21/84*   (2013.01)

(52) U.S. Cl.
CPC .............. *G06F 21/84* (2013.01); *G06F 21/53* (2013.01); *G06F 2221/032* (2013.01)

(58) Field of Classification Search
CPC ..... G06F 21/84; G06F 21/53; G06F 2221/032
(Continued)

(56) References Cited

U.S. PATENT DOCUMENTS 11,003,745 B2   5/2021   Yao
11,100,227 B2   8/2021   Li et al.
(Continued)

FOREIGN PATENT DOCUMENTS

CN    105528554 A    4/2016
CN    107077565 A    8/2017
(Continued)

OTHER PUBLICATIONS

Zheng et al., "A Survey on System Security Isolation Technology," Chinese Journal of Computers, vol. 40, No. 5, 23 pages (with English abstract) (May 2017).
(Continued)

*Primary Examiner* — Thanh T Le
(74) *Attorney, Agent, or Firm* — Leydig, Voit & Mayer, Ltd.

(57) ABSTRACT

Embodiments of this application provide an information processing method and apparatus. Trusted execution environments (TEEs) that can execute a procedure of processing a display request to obtain a display result are deployed in a terminal device. In this way, when the terminal device obtains a first display request through a first TEE, and the first display request includes display information of a first interface, the terminal device can draw the first interface through a first trusted user interface (TUI) framework in the first TEE. Therefore, a procedure of processing the first display request is implemented. A TUI display driver is integrated in a second TEE, and thus, the terminal device can call the TUI display driver of the second TEE to display the first interface. As a result, security of obtaining a display result by the terminal device is improved.

20 Claims, 12 Drawing Sheets

(58) Field of Classification Search
USPC .......................................................... 726/26
See application file for complete search history.

(56) References Cited

U.S. PATENT DOCUMENTS

| | | | |
|---|---|---|---|
| 11,874,903 B2 | 1/2024 | Yao | |
| 11,989,618 B2 | 5/2024 | Zhang et al. | |
| 2016/0142890 A1* | 5/2016 | Drozdovskyy | H04W 12/086 455/419 |
| 2018/0121681 A1 | 5/2018 | Huang et al. | |
| 2019/0297084 A1* | 9/2019 | Li | G06F 9/445 |
| 2020/0234275 A1* | 7/2020 | Zhang | G06F 21/53 |
| 2021/0303734 A1 | 9/2021 | Tsirkin | |
| 2021/0326492 A1* | 10/2021 | Wang | G06Q 20/3272 |
| 2022/0155819 A1 | 5/2022 | Zhang et al. | |
| 2022/0158856 A1 | 5/2022 | Maximov et al. | |
| 2022/0245878 A1* | 8/2022 | Zhang | G06F 9/451 |

FOREIGN PATENT DOCUMENTS

| | | |
|---|---|---|
| CN | 109753347 A | 5/2019 |
| CN | 110059500 A | 7/2019 |
| CN | 112307483 A | 2/2021 |
| CN | 113051542 A | 6/2021 |
| CN | 113051572 A | 6/2021 |
| CN | 113192237 A | 7/2021 |
| CN | 113536285 A | 10/2021 |
| CN | 113868673 A | 12/2021 |
| CN | 115396852 A | 11/2022 |
| CN | 117744068 A | 3/2024 |
| WO | 2020200411 A1 | 10/2020 |
| WO | 2021077882 A1 | 4/2021 |
| WO | 2023134376 A1 | 7/2023 |

OTHER PUBLICATIONS

Yang, Sui-shan, "Research on Architecture of Secure Mobile Phones Based on TEE," Guangzhou Research Institute of China Telecom Corporation Co., Ltd., 6 pages (with English abstract) (2016).

Wu et al., "A Review of System Security Protection Technology Based on TrustZone," Information Security and Communications Privacy, 12 pages (with English abstract) (Oct. 2022).

Ezzeddine et al., "Issues in Trustworthy Software Systems," 2015 IEEE Trustcom/BigDataSE/ISPA, 6 pages (Dec. 3, 2015).

Yang, Sui-Shan, "Research on Architecture of Secure Mobile Phones Based on TEE," Mobile Communication, Guangzhou Research Institute of China Telecom Corporation Co., Ltd., Article No. 1006-1010(2016)21-0034-05, 6 pages (Aug. 1, 2016).

* cited by examiner

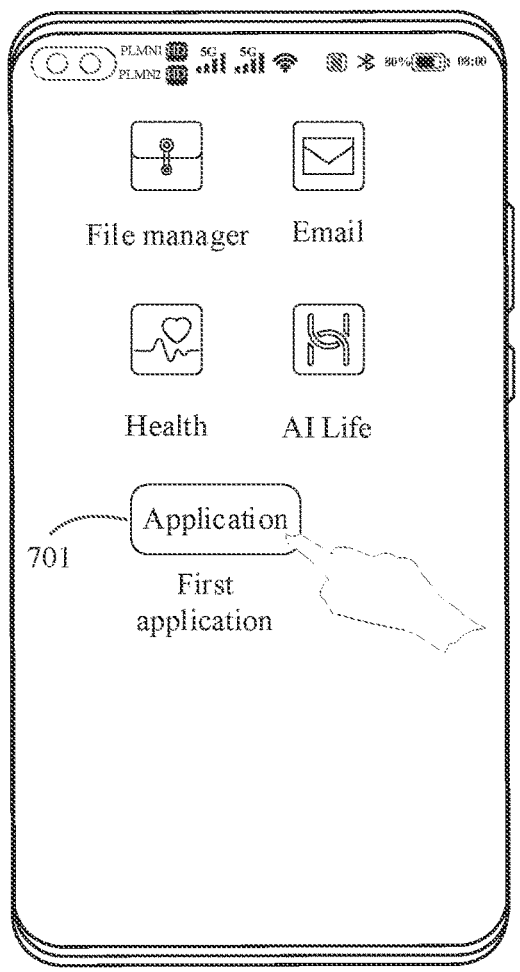
FIG. 7a
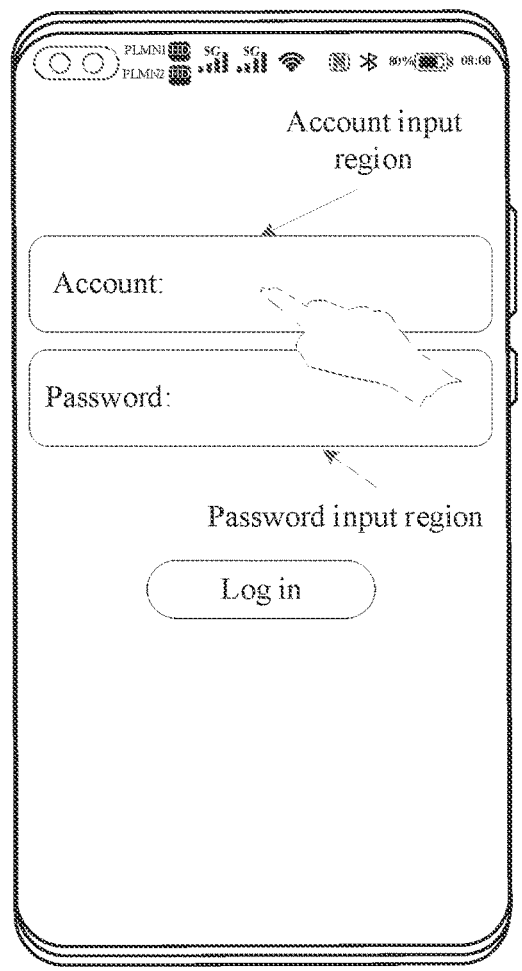
FIG. 7b
TO
FIG. 7c

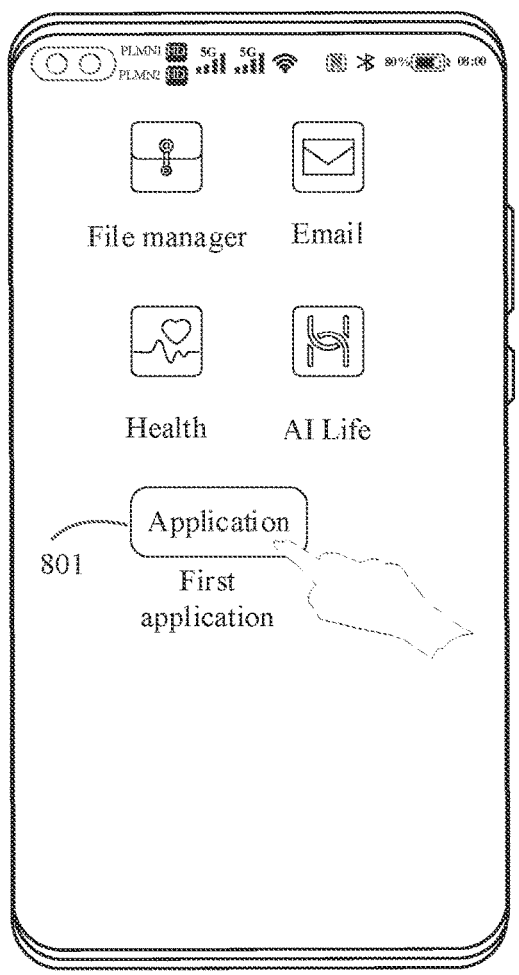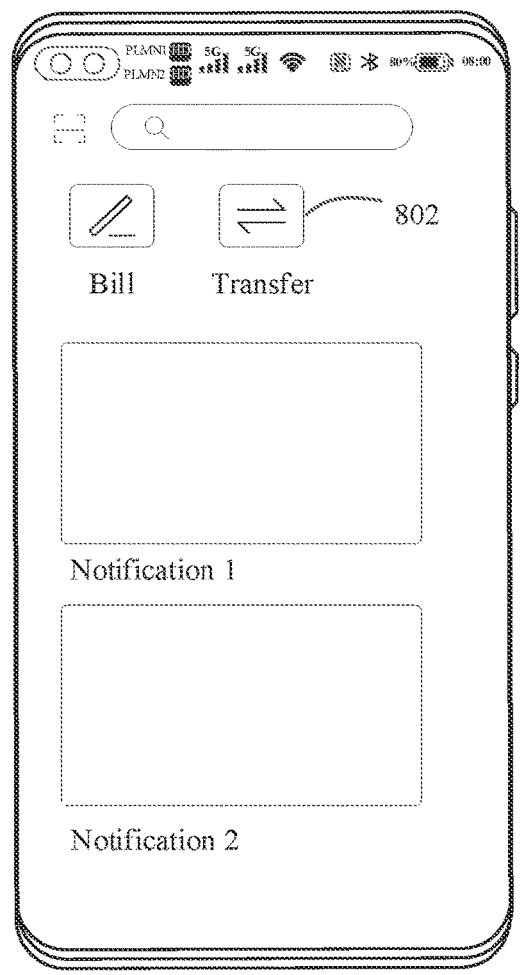
FIG. 8a
FIG. 8b
TO
FIG. 8c

INFORMATION PROCESSING METHOD AND APPARATUS FOR OBTAINING A DISPLAY RESULT BY A TERMINAL DEVICE

CROSS-REFERENCE TO RELATED APPLICATIONS

This application is a national stage of International Application No. PCT/CN2022/138807, filed on Dec. 13, 2022, which claims priority to Chinese Patent Application No. 202210051809.1, filed on Jan. 17, 2022. The disclosures of both of the aforementioned applications are hereby incorporated by reference in their entireties.

TECHNICAL FIELD

This application relates to the field of terminal technologies, and in particular, to an information processing method and apparatus.

BACKGROUND

With the development of terminal technologies, a terminal device can provide a user with different functions, so that the terminal device can meet different requirements of the user. When the terminal device provides the user with the different functions, the user may be required to input sensitive information such as a user name, a password, or a card number. However, a hacker may obtain the sensitive information of the user by cracking a system or in another manner.

SUMMARY

Embodiments of this application provide an information processing method and apparatus, to improve security of obtaining a display result by a terminal device.

In some scenarios, a rich execution environment (REE) and a trusted execution environment (TEE) are deployed in the terminal device. The TEE can provide a trusted user interface (TUI) function. Therefore, when the terminal device obtains a display request through an application in the REE, the terminal device can switch an operating environment to the TEE, so that the terminal device can obtain the display request through the TEE. Furthermore, the terminal device can execute a procedure of processing the display request through the TUI function provided by the TEE to obtain a display result.

In some embodiments of this application. TEEs that can execute a procedure of processing a display request to obtain a display result are provided in a terminal device. In this way, when the terminal device obtains a first display request through a first TEE, where the first display request includes display information of a first interface, the terminal device can draw the first interface through a first TUI framework in the first TEE. Therefore, a procedure of processing the first display request is implemented. A TUI display driver is integrated in a second TEE, and thus, the terminal device can call the TUI display driver of the second TEE to display the first interface. Security of obtaining the display result by the terminal device is improved.

According to a first aspect, an embodiment of this application provides an information processing method and apparatus, applied to a terminal device. A rich execution environment REE and at least two trusted execution environments TEEs are deployed in the terminal device, where the REE includes one or more applications. The method includes: When the terminal device obtains a first display request in a first application, the terminal device obtains the first display request from the first application based on a first trusted user interface TUI trusted application, where the first application is any one of the applications in the REE, the first display request is used to display a first interface, the first display request includes display information of the first interface, the first TUI trusted application is run in a first TEE, and the first TEE is a TEE in the at least two trusted execution environments TEEs. The terminal device obtains the first display request from the first TUI trusted application based on a first TUI framework, where the first TUI framework is run in the first TEE. The terminal device draws the first interface based on the first TUI framework. The terminal device obtains, from the first TUI framework based on a TUI server end, information used to indicate to display the first interface, where the TUI server end is run in a second TEE, the second TEE is a TEE in the at least two trusted execution environments TEEs, and a TUI display driver is integrated in the second TEE. The terminal device calls, based on the TUI server end, the TUI display driver to display the first interface. In this way, the terminal device can draw the first interface through the first TUI framework in the first TEE and display the first interface through the TUI display driver in the second TEE. Therefore, security of obtaining the display result by the terminal device is improved.

In a possible implementation, a TUI input driver is further integrated in the second TEE, and the first interface includes an input component. The method further includes: When the terminal device receives a trigger for the input component in the first interface based on the TUI server end, the terminal device obtains first security information based on the TUI server end, where the first security information is obtained by calling the TUI input driver by the TUI server end, the first security information is information that is input based on the input component, and the first security information includes an account password and a payment password. The terminal device obtains the first security information from the TUI server end based on the first TUI trusted application. The terminal device sends the first security information to a first server based on the first TUI trusted application, where the first server is configured to serve the first application. When the first server determines that the first security information matches with preset security information, the terminal device obtains, based on the first application information indicating successful matching from the first server. The terminal device displays a second interface based on the first application. In this way, after the terminal device displays the first interface, the terminal device receives the trigger for the input component in the first interface. Therefore, the terminal device can, based on a determination of the first server, improve security of displaying the second interface.

In a possible implementation, that the terminal device obtains the first security information from the TUI server end based on the first TUI trusted application includes: The terminal device sends the first security information to a hypervisor based on the TUI server end. The terminal device sends the first security information to a system kernel of the first TEE based on the hypervisor. The terminal device sends the first security information to a virtual machine inter-process communication VM IPC client based on the system kernel of the first TEE. The terminal device sends the first security information to the first TUI framework based on the virtual machine inter-process communication VM IPC client. When the terminal device calls a TUI application programming interface API, the terminal device sends the first security information to the first TUI trusted application based on the first TUI framework. The terminal device obtains the first security information based on the first TUI trusted application. The first TUI trusted application is in the first TEE, and the TUI server end is in the second TEE. The first TEE and the second TEE can perform data interaction through the hypervisor, so that system security of the terminal device is improved.

In a possible implementation, that the terminal device obtains the first display request from the first application based on a first trusted user interface TUI trusted application includes: The terminal device sends the first display request to the system kernel of the REE based on the first application. The terminal device sends the first display request to the hypervisor based on the system kernel of the REE. The terminal device sends the first display request to the first TUI trusted application based on the hypervisor. The terminal device obtains the first display request based on the first TUI trusted application. In this way, the terminal device can perform subsequent steps after the terminal device obtains the first display request based on the first TUI trusted application.

In a possible implementation, that the terminal device obtains the first display request from the first TUI trusted application based on a first TUI framework includes: When the terminal device calls the TUI application programming interface API, the terminal device sends the first display request to the first TUI framework based on the first TUI trusted application. The terminal device obtains the first display request based on the first TUI framework. In this way, the terminal device can perform subsequent steps after the terminal device obtains the first display request based on the first TUI framework.

In a possible implementation, that the terminal device obtains, from the first TUI framework based on a TUI server end, information used to indicate to display the first interface includes: The terminal device sends, to the virtual machine inter-process communication VM IPC client based on the first TUI framework, the information used to indicate to display the first interface. The terminal device sends, to the system kernel of the first TEE based on the virtual machine inter-process communication VM IPC client, the information used to indicate to display the first interface. The terminal device sends, to the hypervisor based on the system kernel of the first TEE, the information used to indicate to display the first interface. The terminal device sends the information used to indicate to display the first interface to the TUI server end based on the hypervisor. The terminal device obtains, based on the TUI server end, the information used to indicate to display the first interface. In this way, after the terminal device obtains, based on the TUI server end, the information used to indicate to display the first interface, the terminal device can display the first interface. Because the TUI server end is in the second TEE, the terminal device can improve security of displaying the first interface.

In a possible implementation, that the terminal device obtains a first display request in a first application includes: The terminal device displays a third interface, where the third interface is an interface in the first application, and the third interface includes an input region. The terminal device obtains the first display request when the terminal device receives a trigger for the input region in the third interface through the first application.

In a possible implementation, that the terminal device displays a third interface includes: The terminal device displays a fourth interface, where the fourth interface includes a first control configured to open the first application. The terminal device obtains a second display request when the terminal device receives a trigger for the first control in the fourth interface through the first application, where the second display request is used to display the third interface, and the second display request includes display information of the third interface. The terminal device displays the third interface based on the second display request.

In a possible implementation, that the terminal device displays the third interface based on the second display request includes: The terminal device sends the second display request to the system kernel of the REE based on the first application. The terminal device sends the second display request to the hypervisor based on the system kernel of the REE. The terminal device sends the second display request to the first TUI trusted application based on the hypervisor. When the terminal device calls the TUI application programming interface API, the terminal device sends the second display request to the first TUI framework based on the first TUI trusted application, the terminal device draws the third interface based on the first TUI framework, and the terminal device sends information used to indicate to display the third interface to the virtual machine inter-process communication VM IPC client based on the first TUI framework. The terminal device sends the information used to indicate to display the third interface to the system kernel of the first TEE based on the virtual machine inter-process communication VM IPC client. The terminal device sends the information used to indicate to display the third interface to the hypervisor based on the system kernel of the first TEE. The terminal device sends the information used to indicate to display the third interface to the TUI server end based on the hypervisor. The terminal device calls the TUI display driver based on the TUI server end to display the third interface.

In a possible implementation, that the terminal device obtains a first display request in a first application includes: The terminal device displays a fifth interface, where the fifth interface is an interface after the first application is opened, and the fifth interface includes a third control. The terminal device obtains the first display request when the terminal device receives a trigger for the third control.

According to a second aspect, an embodiment of this application provides an information processing apparatus, applied to a terminal device. A rich execution environment REE and at least two trusted execution environments TEEs are deployed in the information processing apparatus, where the REE includes one or more applications, and the apparatus includes a processing unit and a display unit.

For example, the processing unit is configured to: when the terminal device obtains a first display request in a first application, obtain the first display request from the first application based on a first trusted user interface TUI trusted application, where the first application is any one of the applications in the REE, the first display request is used to display a first interface, the first display request includes display information of the first interface, the first TUI trusted application is run in a first TEE, and the first TEE is a TEE in the at least two trusted execution environments TEEs. The processing unit is further configured to obtain the first display request from the first TUI trusted application based on a first TUI framework, where the first TUI framework is run in the first TEE. The processing unit is further configured to draw the first interface based on the first TUI framework. The processing unit is further configured to obtain, from the first TUI framework based on a TUI server end, information used to indicate to display the first interface, where the TUI server end is run in a second TEE, the second TEE is a TEE in the at least two trusted execution environments TEEs, and a TUI display driver is integrated in the second TEE. The display unit is configured to call the TUI display driver based on the TUI server end to display the first interface.

In a possible implementation, a TUI input driver is further integrated in the second TEE, and the first interface includes an input component. The processing unit is further configured to obtain first security information based on the TUI server end when the terminal device receives a trigger for the input component in the first interface based on the TUI server end, where the first security information is obtained by calling the TUI input driver by the TUI server end, the first security information is information that is input based on the input component, and the first security information includes an account password and a payment password. The processing unit is further configured to obtain the first security information from the TUI server end based on the first TUI trusted application. The processing unit is further configured to send the first security information to a first server based on the first TUI trusted application, where the first server is configured to serve the first application. When the first server determines that the first security information matches with preset security information, the processing unit is further configured to obtain information indicating successful matching from the first server based on the first application. The display unit is further configured to display a second interface based on the first application.

In a possible implementation, the processing unit is specifically configured to: send the first security information to a hypervisor based on the TUI server end: send the first security information to a system kernel of the first TEE based on the hypervisor: send the first security information to a virtual machine inter-process communication VM IPC client based on the system kernel of the first TEE: send, by the terminal device, the first security information to the first TUI framework based on the virtual machine inter-process communication VM IPC client: when the terminal device calls a TUI application programming interface API, send the first security information to the first TUI trusted application based on the first TUI framework; and obtain the first security information based on the first TUI trusted application.

In a possible implementation, the processing unit is specifically configured to: sending the first display request to the system kernel of the REE based on the first application: send the first display request to the hypervisor based on the system kernel of the REE: send the first display request to the first TUI trusted application based on the hypervisor; and obtain the first display request based on the first TUI trusted application.

In a possible implementation, the processing unit is specifically configured to: when the terminal device calls the TUI application programming interface API, send the first display request to the first TUI framework based on the first TUI trusted application; and obtain the first display request based on the first TUI framework.

In a possible implementation, the processing unit is specifically configured to: send, to the virtual machine inter-process communication VM IPC client based on the first TUI framework, the information used to indicate to display the first interface: send, to the system kernel of the first TEE based on the virtual machine inter-process communication VM IPC client, the information used to indicate to display the first interface: send, to the hypervisor based on the system kernel of the first TEE, the information used to indicate to display the first interface: send, to the TUI server end based on the hypervisor, the information used to indicate to display the first interface; and obtain, based on the TUI server end, the information used to indicate to display the first interface.

In a possible implementation, the processing unit is specifically configured to: displaying a third interface, where the third interface is an interface in the first application, and the third interface includes an input region; and obtain the first display request when the terminal device receives a trigger for the input region in the third interface through the first application.

In a possible implementation, the processing unit is specifically configured to: display a fourth interface, where the fourth interface includes a first control configured to open the first application: obtain a second display request when the terminal device receives a trigger for the first control in the fourth interface through the first application, where the second display request is used to display the third interface, and the second display request includes display information of the third interface; and display the third interface based on the second display request.

In a possible implementation, the processing unit is specifically configured to: send the second display request to the system kernel of the REE based on the first application: send the second display request to the hypervisor based on the system kernel of the REE: send the second display request to the first TUI trusted application based on the hypervisor: when the terminal device calls the TUI application programming interface API, send the second display request to the first TUI framework based on the first TUI trusted application; draw the third interface based on the first TUI framework: send, to the virtual machine inter-process communication VM IPC client based on the first TUI framework, information used to indicate to display the third interface: send, to the system kernel of the first TEE based on the virtual machine inter-process communication VM IPC client, the information used to indicate to display the third interface: send, to the hypervisor based on the system kernel of the first TEE, the information used to indicate to display the third interface: send, to the TUI server end based on the hypervisor, the information used to indicate to display the third interface; and call, based on the TUI server end, the TUI display driver to display the third interface.

In a possible implementation, the processing unit is specifically configured to: display a fifth interface, where the fifth interface is an interface after the first application is opened, and the fifth interface includes a third control; and obtain the first display request when the terminal device receives a trigger for the third control.

According to a third aspect, an embodiment of this application provides an information processing apparatus. The apparatus may include a processor and a memory. The memory is configured to store code instructions, and the processor is configured to run the code instructions to execute the method according to any one of the first aspect or the possible implementations of the first aspect.

According to a fourth aspect, an embodiment of this application provides an information processing system. The system may include the apparatus described in the second aspect and the various possible implementations of the second aspect.

According to a fifth aspect, an embodiment of this application provides a computer-readable storage medium. The computer-readable storage medium stores a computer program or instructions. When the computer program or instructions are run on a computer, the computer performs the method according to any one of the first aspect or the possible implementations of the first aspect.

According to a sixth aspect, an embodiment of this application provides a computer program product including a computer program. When the computer program is run on a computer, the computer performs the method according to any one of the first aspect or the possible implementations of the first aspect.

According to a seventh aspect, this application provides a chip or a chip system. The chip or the chip system includes at least one processor and a communication interface. The communication interface and the at least one processor are interconnected through a line. The at least one processor is configured to run a computer program or instructions, to perform the method described in the first aspect or any one of the possible implementations of the first aspect, where the communication interface in the chip may be an input/output interface, a pin, a circuit, or the like.

In a possible implementation, the chip or the chip system described in this application further includes at least one memory, and the at least one memory stores instructions. The memory may be a storage unit in the chip, for example, a register or a cache, or may be a storage unit (for example, a read-only memory or a random access memory) of the chip.

It should be understood that the second aspect to the seventh aspect of this application correspond to the technical solutions of the first aspect of this application, and the beneficial effects obtained by each aspect and corresponding feasible implementations are similar, and will not be repeated herein again.

BRIEF DESCRIPTION OF DRAWINGS

FIG. 7a-FIG. 7d are schematic diagrams of interfaces of an information processing method according to an embodiment of this application:

FIG. 8a-FIG. 8e are schematic diagrams of interfaces of an information processing method according to an embodiment of this application:

DESCRIPTION OF EMBODIMENTS

Figure 1:
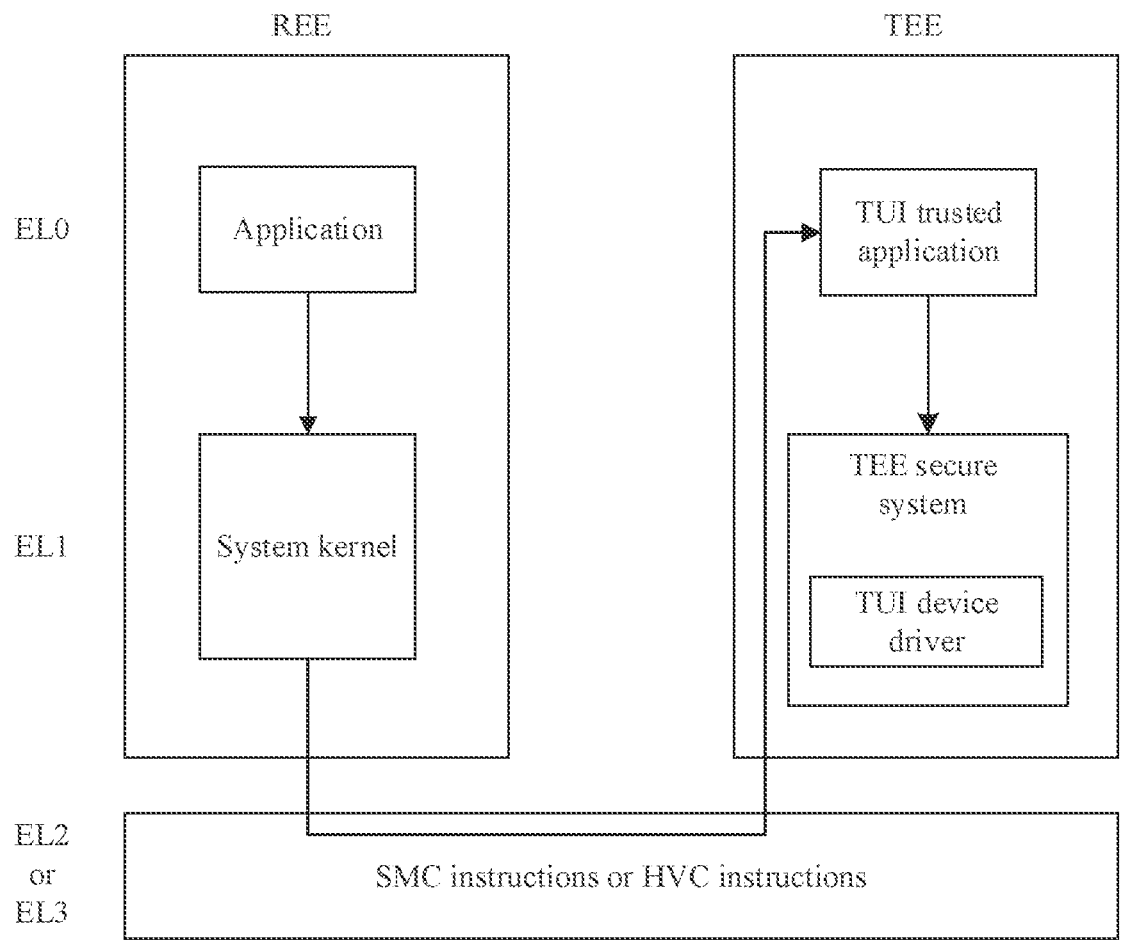
FIG. 1 is a schematic diagram of an architecture of implementing a TUI function using a single TEE according to an embodiment of this application.

In order to clearly describe the technical solutions in the embodiments of this application, in the embodiments of this application, words such as "first" and "second" are used to distinguish between same or similar items that have basically a same function and effect. For example, a first chip and a second chip are merely intended to distinguish between different chips, but not to limit a sequence of the first chip and the second chip. A person skilled in the art may understand that words such as "first" and "second" do not limit a quantity and an execution order, and the words "first" and "second" are not necessarily different.

It should be noted that in embodiments of this application, words such as "an example" or "for example" are used to indicate an example, an illustration, or a description. Any embodiment or design scheme described as "example" or "for example" in this application should not be construed as being preferred or having more advantages than another embodiment or design scheme. To be precise, the use of the term such as "in an example" or "for example" is intended to present a related concept in a specific manner.

In embodiments herein, "at least one" refers to one or more, and "a plurality" refers to two or more. In this application, "and/or" is an association relationship describing associated objects, and indicates that three relationships may exist. For example, A and/or B may indicate that only A exists, both A and B exist, and only B exists. A and B each may be singular or plural. The character "/" generally indicates an "or" relationship between the associated objects. "At least one of the following items" or a similar expression means any combination of these items, including any combination of a single item or a plurality of items. For example, at least one of a, b, or c may represent "a", "b", "c", "a and b", "a and c", "b and c", or "a, b, and c", where a, b, and c may be singular or plural.

With the development of terminal technologies, a terminal device can provide a user with different functions, so that the terminal device can meet different requirements of the user. When the terminal device provides the user with the different functions, the user may be required to input sensitive information such as user names, passwords, or card numbers. However, a hacker can obtain the sensitive information of the user by cracking a system, or through other manners such as a malicious text input method, a keystroke log, and a screenshot. This poses a threat to security of a user account.

In a possible manner, an REE and a TEE are deployed in a terminal device, and the TEE can provide a TUI function. Therefore, when the terminal device obtains a display request through an application in the REE, the terminal device can switch an operating environment to the TEE, so that the terminal device can obtain the display request through the TEE. Furthermore, the terminal device can execute a procedure of processing the display request through the TUI function provided by the TEE to obtain a display result.

For example, FIG. 1 is a schematic diagram of an architecture of implementing a TUI function using a single TEE according to an embodiment of this application. As shown in FIG. 1, when a terminal device obtains a display request through an application in an REE, the terminal device can send the display request to a system kernel of the REE through the application. When the terminal device switches an operating environment to a TEE from the REE through secure monitor call (SMC) instructions or hypervisor call (HVC) instructions, because the TEE includes a TUI trusted application and a TEE security system, and a TEE device driver is integrated in the TEE security system, the terminal device can send the request to the TUI trusted application through the system kernel of the REE. Because the TUI device driver includes a TUI display driver and a TUI input driver, the TUI trusted application can present a display result through the TUI display driver to a user through a secure display buffer.

When the display result indicates that the terminal device displays an input interface, the user can input sensitive information through the input interface. In this way, the terminal device can directly obtain, through the TUI input driver, the sensitive information input by the user, to achieve the purpose of protecting the sensitive information input by the user.

It may be understood that the TUI function provided in the terminal device allows the user to input the sensitive information securely. Therefore, a secure channel for transmitting the sensitive information is formed among a user input interface, a system, and an application, to prevent the sensitive information input by the user from being stolen and transmit the sensitive information to an application layer securely.

In FIG. 1, four exception levels (Els) are defined in the terminal device for the REE and the TEE, which are EL0, EL1, EL2, and EL3. EL0 represents common user space, EL2 is system kernel space, and EL2/EL3 is more secure hypervisor space or trusted zone (TrustZone) space.

It may be understood that, the schematic diagram of the architecture in FIG. 1 is a schematic diagram of an architecture of implementing a TUI function using a single TEE of a terminal device. In FIG. 1, the REE can be referred to as a normal world in the terminal device, and the TEE can be referred to as a secure world in the terminal device. When the application in the REE is required to use the TUI function, the application in the REE can obtain the display request, and the terminal device can enter EL1 from EL0. Furthermore, the terminal device can switch the operating environment from the REE to the TEE through the HVC instructions or the SMC instructions. Therefore, the terminal device can send the display request from the REE to the TEE. Furthermore, the terminal device can obtain the display result through the TUI device driver in the TEE, where the TEE can be an operating environment based on a TrustZone technology, or the TEE can be an operating environment based on a hypervisor technology. The SMC instructions and the HVC instructions are located on the EL2 or EL3.

According to the foregoing manner, in the terminal device, the TEE is deployed on a chip, and the TUI device driver is integrated in the TEE security system of the TEE. In this way, the terminal device executes a procedure of processing the display request through the TUI function provided by the TEE.

However, according to the foregoing manner, when the terminal device obtains a plurality of display requests through the application in the REE, security of obtaining display results by the terminal device may be decreased because the terminal device executes a procedure of processing the display results through the same TEE and obtains the display results through the same TEE.

In a possible manner, in the terminal device, a plurality of TEEs can be deployed on the chip. A TUI device driver is integrated in a TEE security system of each TEE. In this way, when TUI trusted applications of different TEEs obtain display requests from different applications in the REE, the TUI trusted applications of the different TEEs can obtain display results through TUI device drivers in the TEE security systems.

Figure 2:
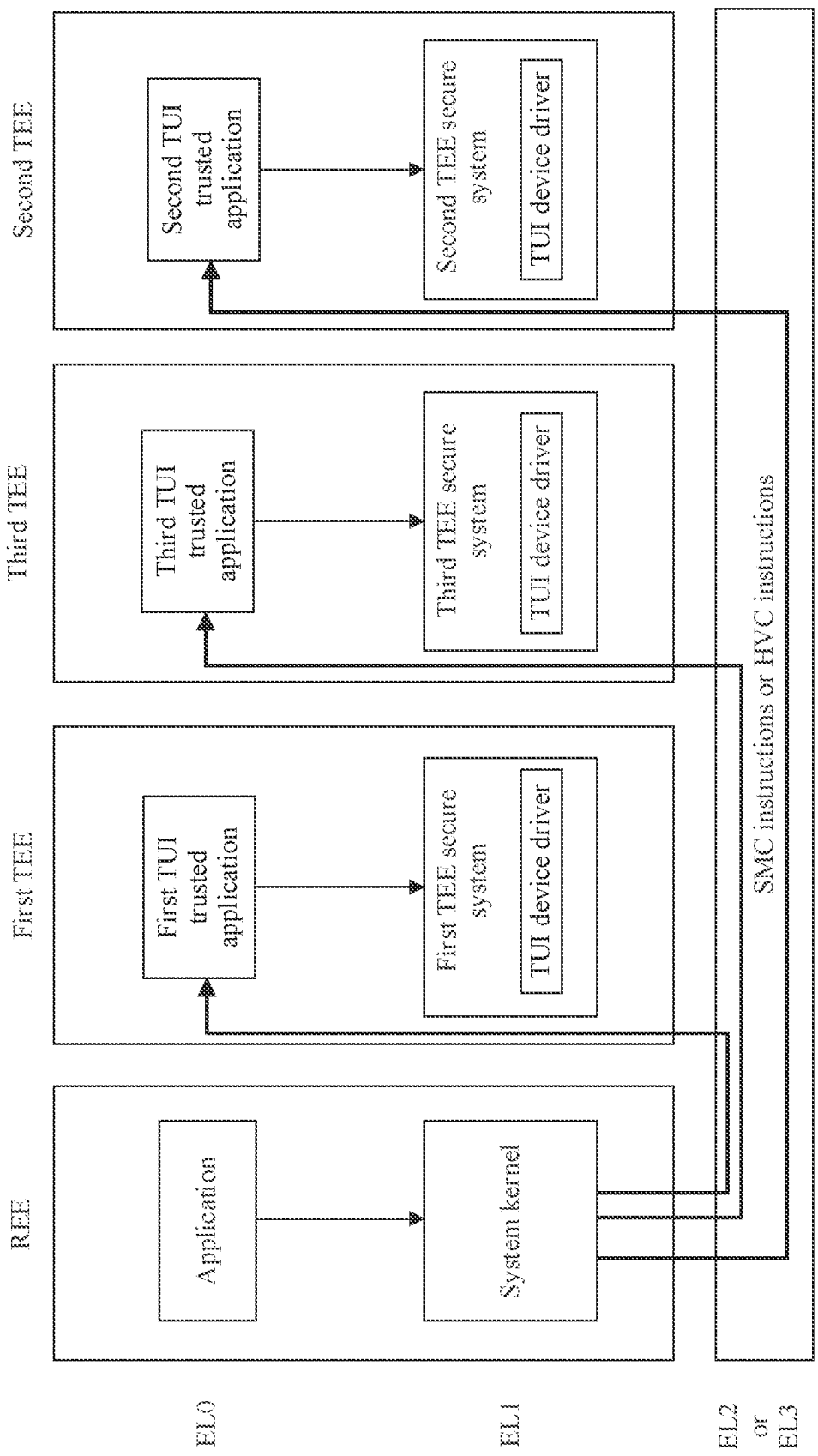
FIG. 2 is a schematic diagram of an architecture of implementing a TUI function using multiple TEEs according to an embodiment of this application.

For example, FIG. 2 is a schematic diagram of an architecture of implementing a TUI function using multiple TEEs according to an embodiment of this application. As shown in FIG. 2, a first TEE, a second TEE, and a third TEE are deployed in a terminal device. The first TEE includes a first TUI trusted application and a first TEE security system. A TUI device driver is integrated in the first TEE security system. The second TEE includes a second TUI trusted application and a second TEE security system. A TUI device driver is integrated in the second TEE security system. The third TEE includes a third TUI trusted application and a third TEE security system. A TUI device driver is integrated in the third TEE security system. Any TUI device driver includes a TUI display driver and a TUI input driver.

In FIG. 2, for an implementation process in which the terminal device obtains a display request through an application in the REE, and obtains a display result through the TUI device driver in the TEE, reference can be made to adaptive content description shown in FIG. 1. For FIG. 2, a process differs from the process shown in FIG. 1 in that when the terminal device obtains a plurality of display requests through the application in the REE, the terminal device can call different TEEs to obtain display results. The application in the REE shown in FIG. 2 can be a first application or a second application. The different TEEs can be configured to process display requests obtained by different applications.

In FIG. 2, the first TUI trusted application can provide a TUI display service and a TUI input service for the application in the REE. For example, the first TUI trusted application can provide the TUI display service and the TUI input service for the first application in the REE. Because the first TEE operates in a hypervisor mechanism, the first TEE is a trusted virtual machine running a first TEE system. For content related to the second TEE and content related to the third TEE, reference may be made to the foregoing content related to the first TEE. Details are not described herein again.

However, according to the foregoing manner, because the TUI device driver is integrated in the TEE security system in each TEE, manufacturing cost of the terminal device may be increased.

In view of this, some embodiments of this application provide an information processing method and apparatus. TEEs that can execute a procedure of processing a display request to obtain a display result are provided in a terminal device. In this way, when the terminal device obtains a first display request through a first TEE, where the first display request includes display information of a first interface, the terminal device can draw the first interface through a first TUI framework in the first TEE. A procedure of processing the first display request is implemented. A TUI display driver is integrated in a second TEE, and thus, the terminal device can call the TUI display driver of the second TEE to display the first interface. Security of obtaining a display result by the terminal device is improved.

Figure 3:
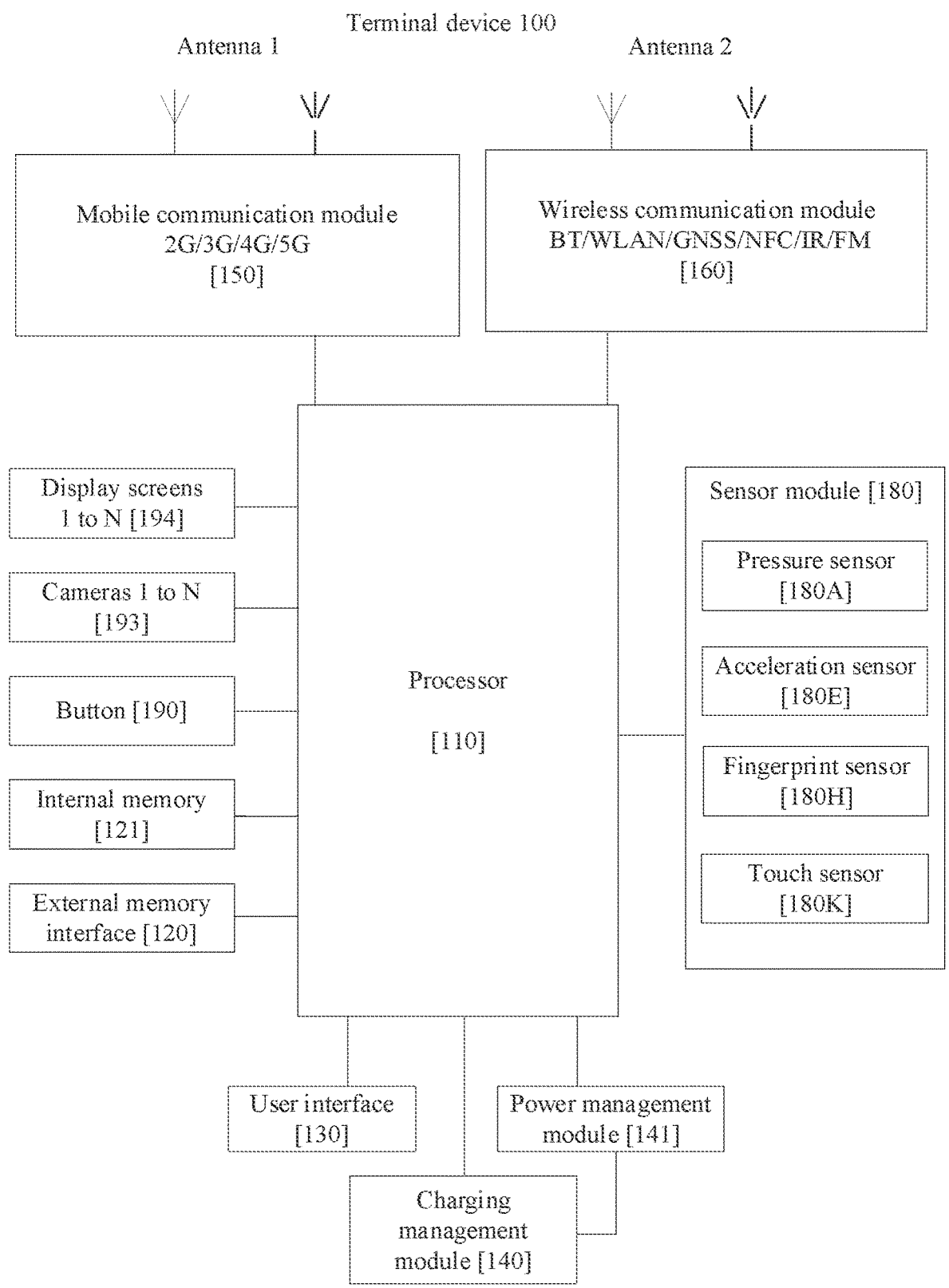
FIG. 3 is a schematic diagram of a hardware structure of a terminal device according to an embodiment of the present application.

The method according to embodiments of this application can be applied to a terminal device. For example, FIG. 3 is a schematic diagram of a hardware structure of a terminal device according to an embodiment of the present application. As shown in FIG. 3, a terminal device 100 may include a processor 110, an external memory interface 120, an internal memory 121, a power management module 141, and antenna 1, an antenna 2, a mobile communication module 150, a wireless communication module 160, a sensor module 180, a button 190, a camera 193, a display screen 194, a user interface 130, a charging management module 140, and the like. The sensor module 180 may include a pressure sensor 180A, an acceleration sensor 180E, a fingerprint sensor 180H, a touch sensor 180K, and the like. The touch sensor 180K and the display screen 194 can form a touchscreen, also referred to as a "touch control screen".

It should be noted that the structure shown in this embodiment of this application does not constitute a specific limitation on the terminal device 100. It may be understood that the terminal device 100 may include more or fewer components than those shown in the figure, or combine some components, or split some components, or have different component arrangements. The components shown in the figure may be implemented by hardware, software, or a combination of software and hardware.

In this embodiment of this application, when a user taps a control provided by an application through the touch control screen, the terminal device receives a trigger for the control and the terminal device can obtain a display request through the application. If an interface displayed on the terminal device under an indication of the display request is an interface related to sensitive information, the terminal device calls a TUI display driver based on the display request to obtain a display result, and can present the display result to the user through the display screen. For example, the terminal device may present a payment completed interface to the user through the display screen, etc.

Figure 4:
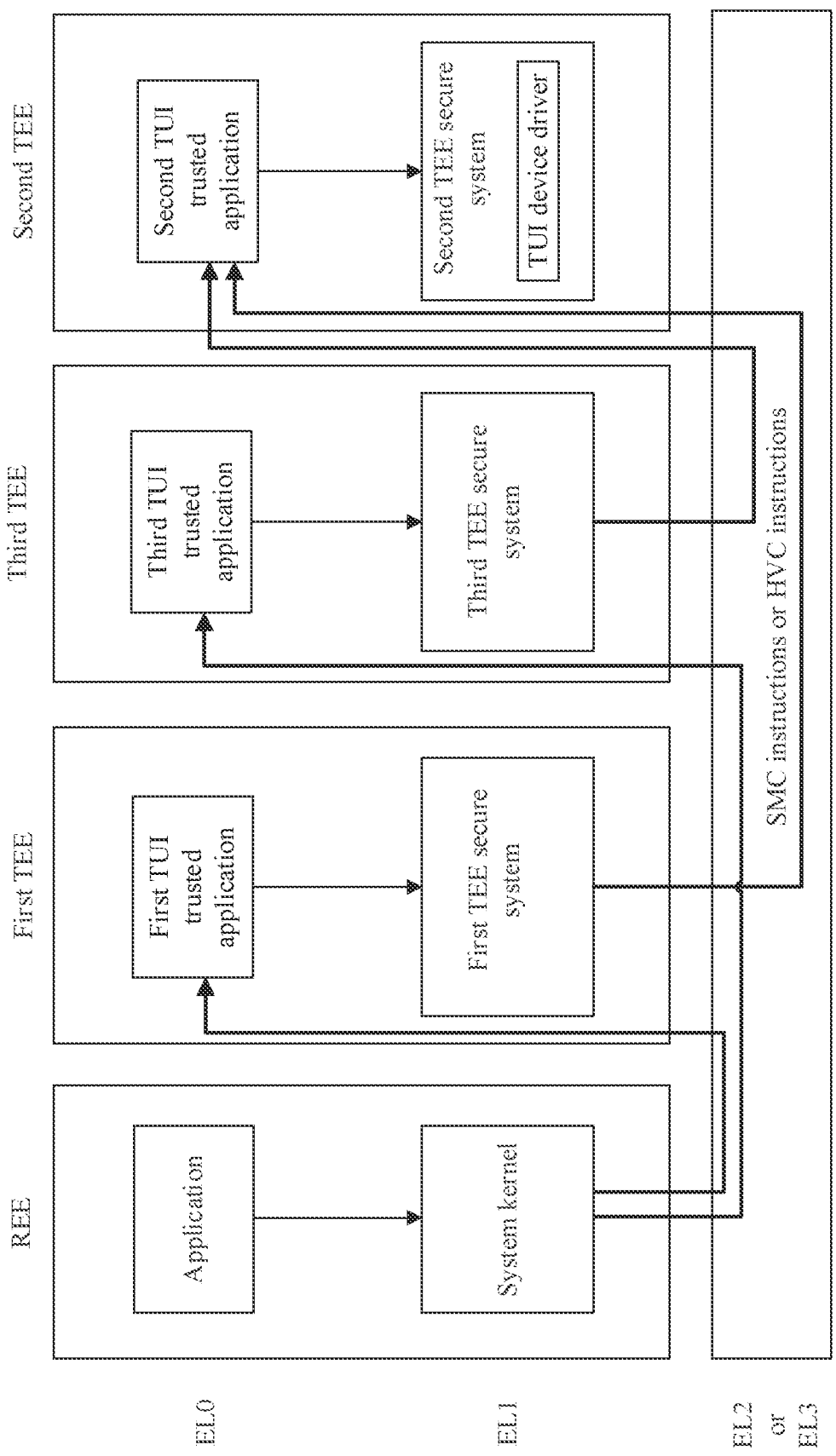
FIG. 4 is a schematic diagram of an architecture of implementing a TUI function using multiple TEEs according to an embodiment of this application.

With reference to FIG. 2 and FIG. 3, for example, FIG. 4 is a schematic diagram of an architecture of implementing a TUI function using multiple TEEs according to an embodiment of this application. The schematic diagram of the architecture shown in FIG. 4 differs from the schematic diagram of the architecture shown in FIG. 2 in that no TUI device driver is integrated in a first TEE security system in a first TEE or in a third TEE security system in a third TEE, and a TUI device driver is integrated in a second TEE security system in a second TEE.

The TUI device driver in the second TEE is a core system for implementing a TUI function. Because no TUI device driver is integrated in the first TEE, the first TEE can send an obtained display request to a second TUI trusted application in the second TEE through a hypervisor, so that the second TUI trusted application can implement a TUI display function and a TUI input function through the TUI device driver in the second TEE. Similarly, the third TEE can also send a request to the second TEE for processing. In this way, when a plurality of TEEs are deployed in the terminal device, the terminal device can uniformly process the requests of the TUI through the second TEE. This can save the manufacturing cost of the terminal device, compared with deploying a TUI device driver in every TEE in the plurality of TEEs.

It should be noted that the first TEE and the third TEE may be understood as TEEs provided by a terminal device manufacturer, or the first TEE and the third TEE may be understood as TEEs deployed by a terminal device manufacturer. The second TEE may be understood as a TEE provided by a chip manufacturer of the terminal device, or the second TEE may be understood as an original TEE (for example, a TEE provided by a chip manufacturer QualcommR) in the terminal device. In this way, the terminal device can allow the TUI device driver in the second TEE security system to act as a driver, so that the TUI device driver in the second TEE security system can serve as a proxy to process the display requests of other TEEs to obtain display results.

It should be noted that a plurality of TEEs based on the hypervisor technology can be deployed in the terminal device, where the first TEE is one TEE in the plurality of TEEs based on the hypervisor technology, the third TEE is one TEE in the plurality of TEEs based on the hypervisor technology, and the second TEE is a TEE based on the TrustZone technology. When no TUI device driver is integrated in the first TEE or the third TEE, the first TEE and the third TEE can obtain the display results through the TUI device driver in the second TEE. This can avoid problems of deep coupling between the first TEE and the third TEE, and integrating the TUI driver, and allow the terminal device manufacturer to deploy a TEE to implement a TUI-related service.

Figure 5:
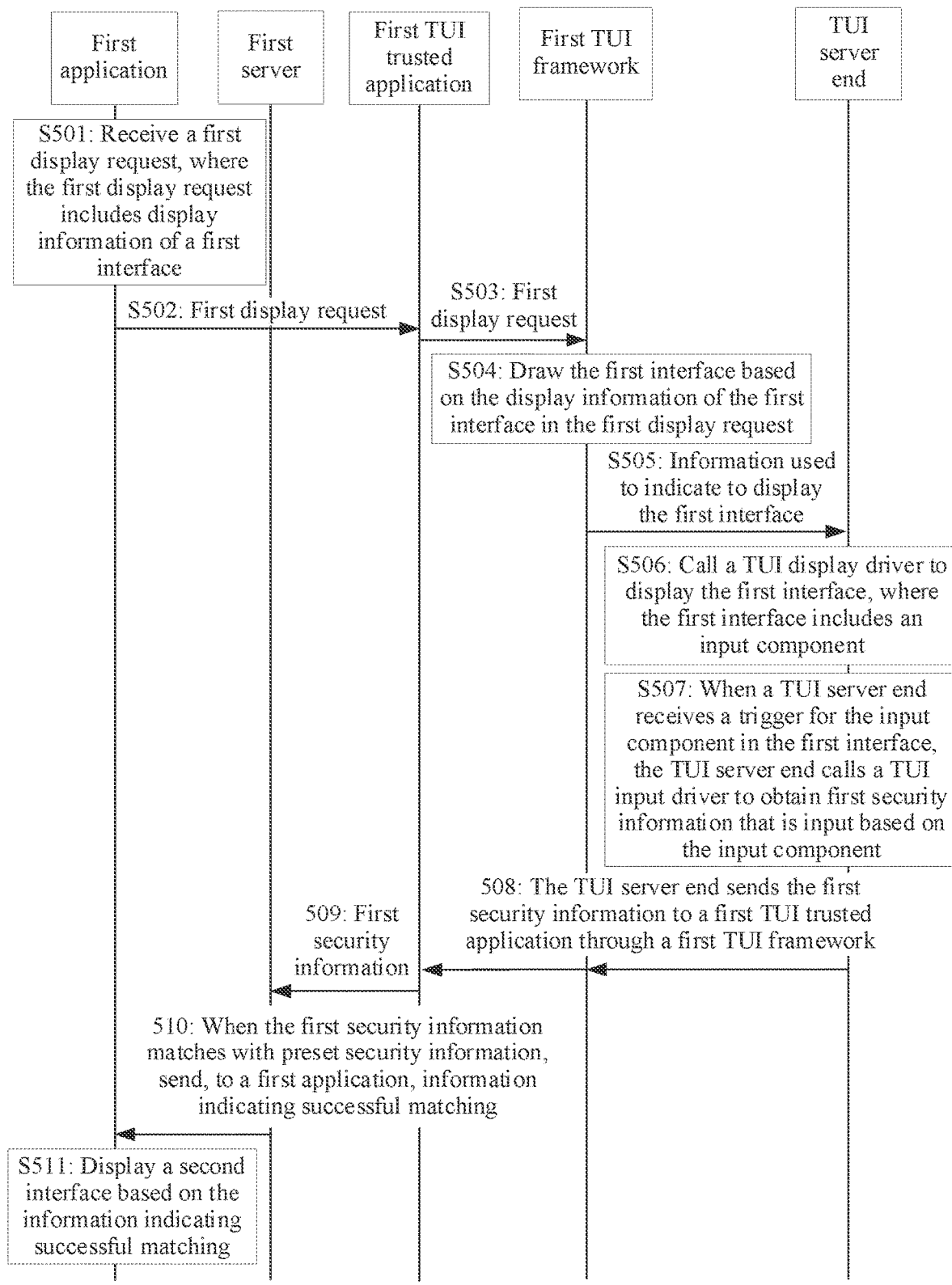
FIG. 5 is a schematic flowchart of an information processing method according to an embodiment of this application.

With reference to the content shown in FIG. 4, for example, FIG. 5 is a schematic flowchart of an information processing method according to an embodiment of this application. As shown in FIG. 5, the method may include the following steps.

S501: A terminal device receives a first display request through a first application in an REE.

In this embodiment of this application, the first application in the REE may be understood as a client application (CA). The first display request is used to display a first interface of the first application. The first interface is an interface of the first application after the first application is opened, and the first interface may be an interface that is of the first application and that is related to sensitive information. For example, the first interface may include a password input interface and the like. The first display request includes display information of the first interface. Content of the first interface can be configured based on an actual application scenario. This is not limited in this application.

In this embodiment of this application, that a terminal device receives a first display request through a first application in an REE may include the following possible implementation.

In a first possible implementation, the terminal device displays a third interface, where the third interface is an interface in the first application, and the third interface includes an input region. When the terminal device receives a trigger for the input region in the third interface through the first application, the terminal device receives the first display request. The third interface may be understood as an interface that is of the first application and that is related to the sensitive information.

It may be understood that a possible implementation in which the terminal device displays a third interface includes: The terminal device displays a fourth interface, where the fourth interface includes a first control configured to open the first application. The terminal device obtains a second display request when the terminal device receives a trigger for the first control in the fourth interface through the first application, where the second display request is used to display the third interface, and the second display request includes display information of the third interface. The terminal device sends the second display request to a first TUI trusted application based on the first application. The terminal device obtains the second display request from the first TUI trusted application based on a first TUI framework, so that the first TUI framework draws the third interface based on the display information of the third interface in the second display request. The terminal device sends, to a TUI server end based on the first TUI framework, information used to indicate to display the third interface, so that the TUI server end calls, based on the information used to indicate to display the third interface, a TUI display driver to display the third interface.

When the terminal device sends the second display request to the first TUI trusted application based on the first application, the first TUI trusted application is run in a first TEE. Because the REE and the first TEE are run in a hypervisor mechanism, the first TEE can be referred to as a first TEE virtual machine (VM). In this way, the terminal device can send the second display request to a system kernel of the REE based on the first application. The terminal device can send the second display request to a hypervisor based on the system kernel of the REE. The terminal device can send the second display request to the first TUI trusted application based on the hypervisor.

When the terminal device obtains the second display request from the first TUI trusted application based on the first TUI framework, the first TUI framework is run in the first TEE. When the terminal device calls a TUI application programming interface (API), the terminal device can send the second display request to the first TUI framework based om the first TUI trusted application, so that the terminal device can obtain the second display request based on the first TUI framework. The API of the TUI is defined by a global platform (GP). The API of the TUI can be described as GP TUI API, or, a standard API of the TUI can be described as TUI API. Therefore, the first TEE can provide a TUI function through the GP TUI API.

When the terminal device sends, to the TUI server end based on the first TUI framework, the information used to indicate to display the third interface, the terminal device sends, to the virtual machine inter-process communication (IPC) VM IPC client based on the first TUI framework, the information used to indicate to display the third interface. The terminal device sends, to a first TEE system kernel based on the VM IPC client, the information used to indicate to display the third interface. The terminal device sends, to the hypervisor based on the first TEE system kernel, the information used to indicate to display the third interface. The terminal device sends, to the TUI server end based on the hypervisor, the information used to indicate to display the third interface. The TUI server end may be understood as the second TUI trusted application in FIG. 4, and the first TEE system kernel is a system kernel of the first TEE.

It may be understood that when the terminal device receives the trigger for the input region in the third interface through the first application, the terminal device can call, based on the TUI server end, a TUI input driver to obtain location information of the input region. Then, the terminal device obtains the location information of the input region and the terminal device can receive the first display request.

The location information of the input region may be point information of the input region. For example, when the user touches the input region at a [x, y] location of a display screen, the terminal device can obtain the location [x, y] through the TUI input driver of the TUI server end.

It should be noted that the first TUI framework is an internal TUI framework of the first TEE, and the first TUI framework can be used to complete core logic of the TUI. Alternatively, it may be understood that the first TUI framework can be used to draw the interface.

It should be noted that the first TEE system kernel is a kernel module of the first TEE. The first TUI framework can call a module related to the VM IPC client, so that the first TUI framework can perform data interaction with a TUI server end in a second TEE based on the module that is called. The module related to the VM IPC client may include one or more of the following: a libTrustedUI module a MinkIPC module, or a VMSocket module.

It should be noted that the TUI server end is run in the second TEE. Because the second TEE operates in the hypervisor mechanism, the second TEE is a trusted virtual machine, and the TUI server end is a server run on the trusted virtual machine. The TUI server end can obtain information from the first TEE, and the TUI server end can further call the TUI display driver or the TUI input driver based on the obtained information.

It should be noted that the REE is an operating environment in the terminal device, or it may be understood that the REE is an operating environment of an Android operating system. Because the REE operates in the hypervisor mechanism, the REE can be referred to as a primary virtual machine, and the REE can run an application in a normal world. This application can be referred to as a normal application, and this application is a CA.

In a second possible implementation, the terminal device displays a fifth interface. The fifth interface is an interface after the first application is opened, and the fifth interface includes a third control. The terminal device receives the first display request when the terminal device receives a trigger for the third control.

S502: The first application sends the first display request to the first TUI trusted application.

In this embodiment of this application, with reference to FIG. 4, the first application can send the first display request to the system kernel of the REE, and the system kernel of the REE sends the first display request to first TUI trusted application through the hypervisor.

S503: The first TUI framework obtains the first display request from the first TUI trusted application.

In this embodiment of this application, the first TUI framework can obtain the first display request from the first TUI trusted application through the GP TUI API.

S504: The first TUI framework draws the first interface based on the display information of the first interface in the first display request.

S505: The first TUI framework sends, to the TUI server end, information used to indicate to display the first interface.

In this embodiment of this application, the first TUI framework can call the VM IPC client to send, to the first TEE system kernel, the information used to indicate to display the first interface. Because the first TEE and the second TEE are run in the hypervisor mechanism, the first TEE system kernel can send, to the TUI server end through the hypervisor, the information used to indicate to display the first interface.

S506: The TUI server end calls, based on the information used to indicate to display the first interface, the TUI display driver to display the first interface.

In this embodiment of this application, because the TUI server end includes the TUI display driver, the TUI display driver can be used to display and output an interface of the TUI. The interface of the TUI may be understood as an interface related to an operation on the sensitive information. In this way, the TUI server end can call, based on the information used to indicate to display the first interface, the TUI display driver to display the first interface. The first interface includes an input component and the input component may be an input key board and the like.

S507: When the TUI server end receives a trigger for the input component in the first interface, the TUI server end calls the TUI input driver to obtain first security information that is input based on the input component.

S508: The TUI server end sends the first security information to the first TUI trusted application through the first TUI framework.

In this embodiment of this application, the second TEE and the first TEE are run in the hypervisor mechanism, the TUI server end is run in the second TEE, and the first TUI framework is run in the first TEE. Therefore, the TUI server end can send the first security information to the first TEE system kernel through the hypervisor. The first TEE system kernel can send the first security information to the first TUI framework through the VM IPC client. The first TUI framework can send the first security information to the first TUI trusted application through the GP TUI API. Thus, the first TUI trusted application obtains the first security information. The first security information may include one or more of the following: an account password or a payment password.

It may be understood that specific content of the first security information can be configured based on an actual application scenario. This is not limited in this application.

With reference to content of S507 and S508, when the first interface further includes a second control, a possible implementation in which the TUI server end sends the first security information to the first TUI trusted application through the first TUI framework includes: when the TUI server end receives a trigger for the second control in the first interface, the TUI server end sends the first security information to the first TUI trusted application through the first TUI framework.

S509: The first TUI trusted application sends the first security information from a first server.

S510: When the first security information matches with preset security information, the first server sends, to the first server, information indicating successful matching.

In this embodiment of this application, the first server is a server corresponding to the first application, and the first server is configured to serve the first application. In this way, when the first server determines that the first security information matches with the preset security information, the first server can send a matching result of the first security information to the first application. For example, when a user name and a password entered by the user are the same as a preset user name and password, the first server can send, to the first server, the information indicating successful matching to the first application.

S511: The first application displays a second interface based on the information indicating successful matching.

In this embodiment of this application, the second interface is related to the first interface. For example, when the first interface is a login interface, the second interface is an interface after a successful login. When the first interface is a payment interface, the second interface is an interface after a successful payment.

Figure 6:
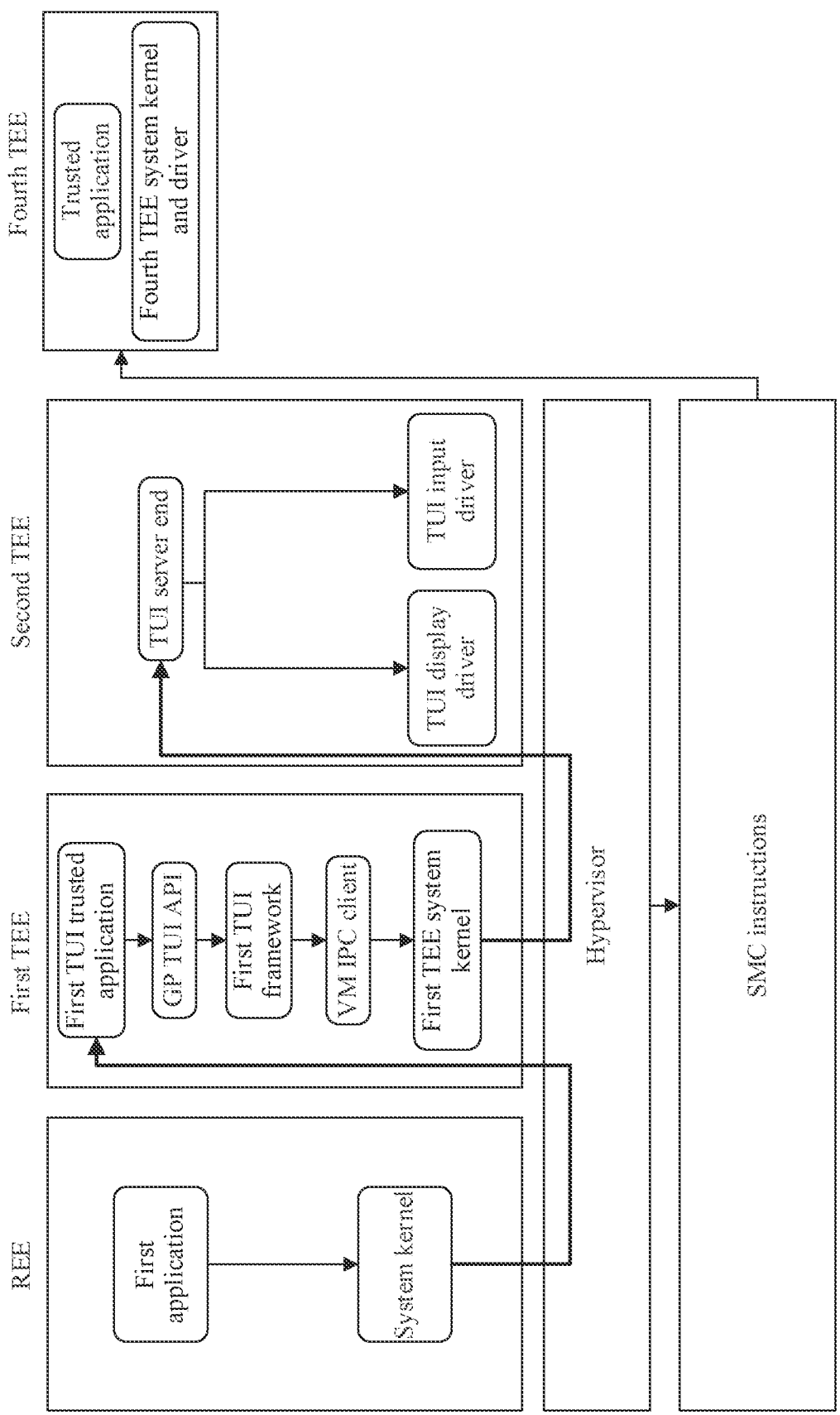
FIG. 6 is a schematic flowchart of an information processing method according to an embodiment of this application.

With reference to the content of FIG. 5, for example, FIG. 6 is a schematic flowchart of an information processing method according to an embodiment of this application. In FIG. 6, for an interaction process among an REE, a first TEE, and a second TEE, reference is made to adaptive content description shown in FIG. 5. A GP TUI API, a first TUI framework, a VM IPC client, and a first TEE system kernel are in a first TEE security system.

It should be noted that, in FIG. 6, when a driver in a fourth TEE is required for a display request obtained by a first application in the REE, the first application can send the display request to a system kernel in the REE. Because the fourth TEE is run is a TrustZone mechanism, the system kernel of the REE can send the display request to the fourth TEE through a hypervisor. When the hypervisor switches an operating environment to the fourth TEE through SMC instruction, the hypervisor can send the display request to a trusted application in the fourth TEE. In this way, the trusted application in the fourth TEE can obtain an interface corresponding to the display request through the system kernel in the fourth TEE and the driver in the fourth TEE.

It may be understood that FIG. 5 shows an interaction process between the first TEE and the second TEE, for an interaction process between the third TEE and the second TEE, reference can be made to the adaptive content description shown in FIG. 5.

Figures 7C, 7D:
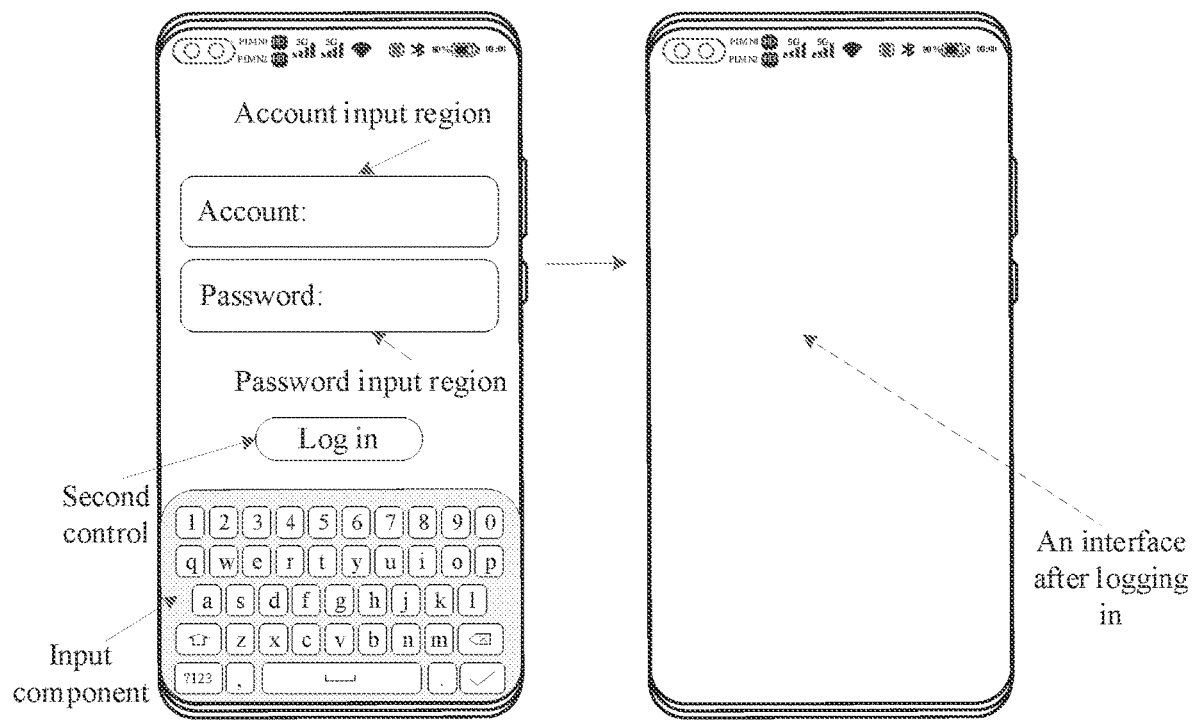

With reference to the content shown in FIG. 5 and FIG. 6, for example, FIG. 7a-FIG. 7d are schematic diagrams of interfaces of an information processing method according to an embodiment of this application. In an interface shown in FIG. 7a, the interface includes one or more of the following application controls, such as a file manager control, an email control, a health control, and an AI life control. The interface further includes a first application control 701. When a user performs a tap, a touch, or another operation to trigger the first application control 701, a terminal device receives a trigger for the first application control 701, and the terminal device can display an interface shown in FIG. 7b, where the first application control 701 can be referred to as a first control and the first control is used to open a first application. The interface shown in FIG. 7a is a fourth interface, and the interface shown in FIG. 7b is a third interface. The third interface is a login interface and the interface includes an account input region and a password input region.

In the interface shown in FIG. 7b, When the user performs the tap, the touch, or another operation to trigger the account input region, the terminal device receives the trigger for the account input region, and the terminal device can display an interface shown in FIG. 7c. The interface is a first interface. The first interface includes an input component and a second control. The input component may be an input keyboard. When the user enters an account in the account input region and enters a password in the password input region through the input keyboard, the terminal device can receive a trigger for the input component. Then, the terminal device can obtain the account and password entered by the user based on the input component. In this way, when the terminal device receives a trigger for the second control in the first interface and determines that the input account and password match with a preset account and password, the terminal device can display an interface shown in FIG. 7d, and the interface can be referred to as a second interface and is an interface after logging in.

With reference in the content shown in FIG. 5 and FIG. 6, FIG. 8a-FIG. 8e are schematic diagrams of interfaces of an information processing method according to an embodiment of this application. In an interface shown in FIG. 8a, the interface includes one or more of the following application controls, such as a file manager control, an email control, a health control, or an AI life control. The interface further includes a first application control 801. When a user logs in a first application in the terminal device, and the user performs a tap, a touch, or another operation to trigger the first application control 801, the terminal device receives an operation for the first application control 801. The terminal device can display an interface shown in FIG. 8b.

Figure 8C:
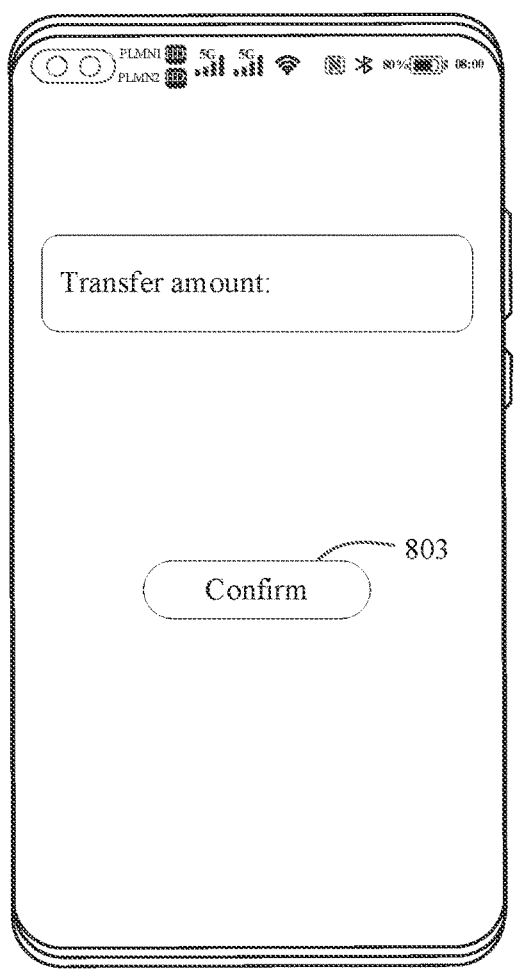

In the interface shown in FIG. 8b, the interface includes a bill control, a transfer control 802, and the like. When the user performs a tap, a touch, or another operation to trigger the transfer control 802, the terminal device receives a trigger for the transfer control 802, and the terminal device can display an interface shown in FIG. 8c. The interface includes a confirm control 803. When the user enters a transfer amount in the interface shown in FIG. 8c and triggers the confirm control 803 through a tap, touch or another operation, the terminal device can display an interface shown in FIG. 8*d*. The interface shown in FIG. 8*c* can be referred to as a fifth interface, the confirm control 803 can be referred to as a third control, and the interface shown in FIG. 8*d* can be referred to as a first interface, which includes an input component.

Figure 8D:
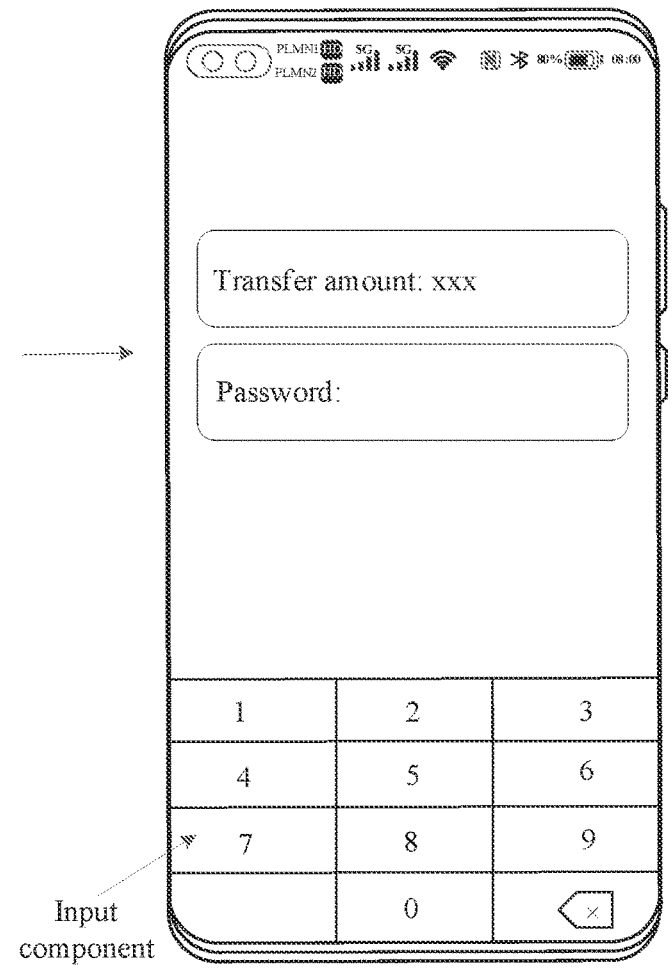
Figure 8E:
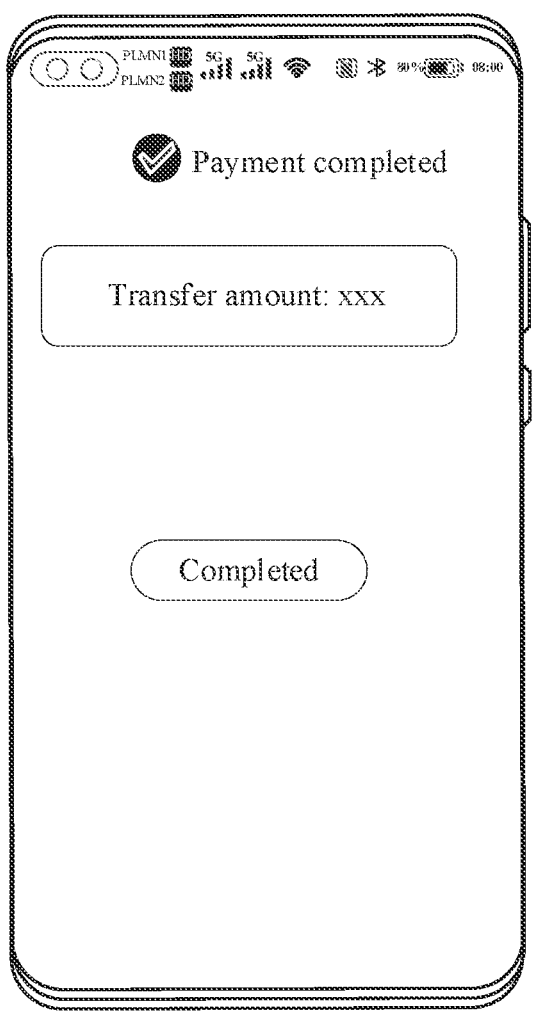

In the interface shown in FIG. 8*d*, when the user triggers the input component through a tap, touch or another operation, the terminal device receives a trigger for the input component and determines that an input password matches with a preset password, the terminal device can display an interface shown in FIG. 8*e*. The interface can be referred to as a second interface and is an interface after a successful transfer.

In the content shown in FIG. 5-FIGS. 8*a*-8*e*, the terminal device implements the procedure of interfaces related to the first application of the REE through the first TUI trusted application and the first TUI framework. The first TUI trusted application and the first TUI framework are run in the first TEE. It may be understood that the terminal device can also implement the procedure of interfaces related to the second application of the REE through the third TUI trusted application and a third TUI framework in the third TEE. For example, when the terminal device obtains a third request through the second application in the REE, the terminal device can display an interface related to the second application based on an interaction process among the second application, the third TUI trusted application, the third TUI framework and the TUI server end. For a specific implementation, reference can be made to adaptive content descriptions shown in FIG. 5-FIGS. 8*a*-8*e*. Details are not described herein again.

It should be noted that in the process in which the terminal device processes the interfaces related to the second application in the REE through the third TUI trusted application and the third TUI framework in the third TEE, the terminal device also displays the interfaces related to the second application through the TUI display driver, such as the login interface or password input interface of the second application. For specific content, reference can be made to adaptive content description shown in FIG. 5. Details are not described herein again.

With reference to the foregoing content, it may be understood that the TEEs in this embodiment of this application can run in a TrustZone environment, or in a trusted virtual environment like a hypervisor. The method provided in this embodiment of this application is a method of implementing the TUI function through multiple TEEs. In this embodiment of this application, the TUI device driver can be integrated in one of the TEEs in the terminal device, and no TUI device driver in integrated in other TEEs deployed in the terminal device. Therefore, a workload of integrated drivers can be reduced and the manufacturing cost of the terminal device can be saved.

It may be understood that when the TEEs deployed in the terminal device can provide a TUI service for the application in the REE, the terminal device can implement the TUI service through the TEEs deployed in the terminal device.

Furthermore, it may be understood that, if a chip manufacturer does not provide the ability to operate the TUI function to a terminal device manufacturer, the terminal device manufacturer may be constrained from improving the TUI function, and the terminal device manufacturer may be constrained from improving the security of the TUI function. In the method according to some embodiments of this application, the terminal device manufacturer can control TUI service logic on the TEEs deployed by the terminal device manufacturer to improve the security. Therefore, independent control of the TUI function can be improved for the terminal device manufacturer. Or, it may be understood that the control of the terminal device manufacturer over the TEEs can be improved. Moreover, the method according to some embodiments of this application allows a TEE of the chip manufacturer to be responsible only for TUI display and TUI input, so that the terminal device manufacturer can have control over the TEE of the chip manufacturer.

The foregoing describes the information processing method in the embodiments of this application. The following describes an apparatus for performing the information processing method provided in the embodiments of this application. It may be understood by a person skilled in the art that the method and the apparatus can be combined with or refer to each other. The information processing apparatus provided in this embodiment of this application can perform the steps of the foregoing information processing method.

Figure 9:
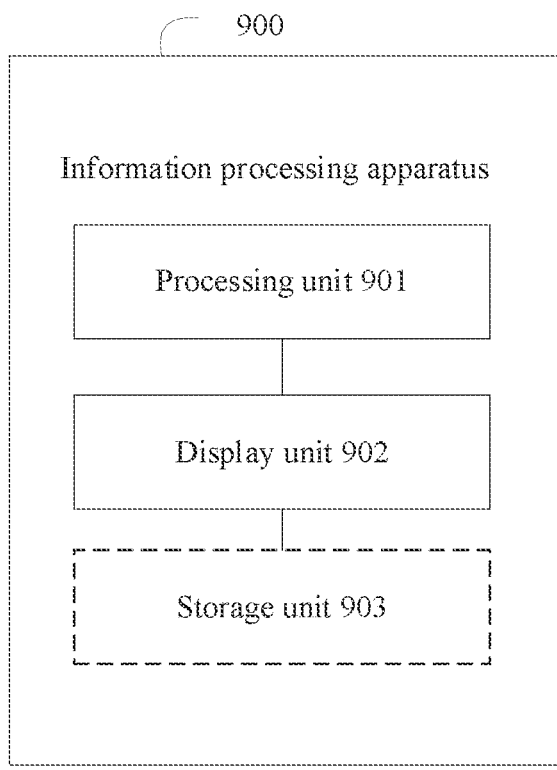
FIG. 9 is a schematic diagram of a structure of an information processing apparatus according to an embodiment of this application.

For example, FIG. 9 is a schematic diagram of a structure of an information processing apparatus according to an embodiment of this application. The information processing apparatus can be applied to a terminal device. A rich execution environment REE and at least two trusted execution environments TEEs are deployed in the information processing apparatus, where the REE includes one or more applications. As shown in FIG. 9, an apparatus 900 may include a processing unit 901 and a display unit 902, where the processing unit 901 is configured to support the information processing apparatus in executing steps of information processing, and the display unit 902 is configured to support the information processing apparatus in executing steps of display.

For example, the processing unit is configured to: when the terminal device obtains a first display request in a first application, obtain the first display request from the first application based on a first trusted user interface TUI trusted application, where the first application is any one of the applications in the REE, the first display request is used to display a first interface, the first display request includes display information of the first interface, the first TUI trusted application is run in a first TEE, and the first TEE is a TEE in the at least two trusted execution environments TEEs. The processing unit is further configured to obtain the first display request from the first TUI trusted application based on a first TUI framework, where the first TUI framework is run in the first TEE. The processing unit is further configured to draw the first interface based on the first TUI framework. The processing unit is further configured to obtain, from the first TUI framework based on a TUI server end, information used to indicate to display the first interface, where the TUI server end is run in a second TEE, the second TEE is a TEE in the at least two trusted execution environments TEEs, and a TUI display driver is integrated in the second TEE. The display unit is configured to call the TUI display driver based on the TUI server end to display the first interface.

In a possible implementation, a TUI input driver is further integrated in the second TEE, and the first interface includes an input component. The processing unit is further configured to obtain first security information based on the TUI server end when the terminal device receives a trigger for the input component in the first interface based on the TUI server end, where the first security information is obtained by calling the TUI input driver by the TUI server end, the first security information is information that is input based on the input component, and the first security information includes an account password and a payment password. The processing unit is further configured to obtain the first security information from the TUI server end based on the first TUI trusted application. The processing unit is further configured to send the first security information to a first server based on the first TUI trusted application, where the first server is configured to serve the first application. When the first server determines that the first security information matches with preset security information, the processing unit is further configured to obtain information indicating successful matching from the first server based on the first application. The display unit is further configured to display a second interface based on the first application.

In a possible implementation, the processing unit is specifically configured to: send the first security information to a hypervisor based on the TUI server end: send the first security information to a system kernel of the first TEE based on the hypervisor: send the first security information to a virtual machine inter-process communication VM IPC client based on the system kernel of the first TEE: send, by the terminal device, the first security information to the first TUI framework based on the virtual machine inter-process communication VM IPC client: when the terminal device calls a TUI application programming interface API, send the first security information to the first TUI trusted application based on the first TUI framework; and obtain the first security information based on the first TUI trusted application.

In a possible implementation, the processing unit is specifically configured to: send the first display request to the system kernel of the REE based on the first application: send the first display request to the hypervisor based on the system kernel of the REE: send the first display request to the first TUI trusted application based on the hypervisor; and obtain the first display request based on the first TUI trusted application.

In a possible implementation, the processing unit is specifically configured to: when the terminal device calls the TUI application programming interface API, send the first display request to the first TUI framework based on the first TUI trusted application; and obtain the first display request based on the first TUI framework.

In a possible implementation, the processing unit is specifically configured to: send, to the virtual machine inter-process communication VM IPC client based on the first TUI framework, the information used to indicate to display the first interface: send, to the system kernel of the first TEE based on the virtual machine inter-process communication VM IPC client, the information used to indicate to display the first interface: send, to the hypervisor based on the system kernel of the first TEE, the information used to indicate to display the first interface: send, to the TUI server end based on the hypervisor, the information used to indicate to display the first interface; and obtain, based on the TUI server end, the information used to indicate to display the first interface.

In a possible implementation, the processing unit is specifically configured to: displaying a third interface, where the third interface is an interface in the first application, and the third interface includes an input region; and obtain the first display request when the terminal device receives a trigger for the input region in the third interface through the first application.

In a possible implementation, the processing unit is specifically configured to: display a fourth interface, where the fourth interface includes a first control configured to open the first application: obtain a second display request when the terminal device receives a trigger for the first control in the fourth interface through the first application, where the second display request is used to display the third interface, and the second display request includes display information of the third interface; and display the third interface based on the second display request.

In a possible implementation, the processing unit is specifically configured to: send the second display request to the system kernel of the REE based on the first application: send the second display request to the hypervisor based on the system kernel of the REE: send the second display request to the first TUI trusted application based on the hypervisor: when the terminal device calls the TUI application programming interface API, send the second display request to the first TUI framework based on the first TUI trusted application: draw the third interface based on the first TUI framework: send, to the virtual machine inter-process communication VM IPC client based on the first TUI framework, information used to indicate to display the third interface: send, to the system kernel of the first TEE based on the virtual machine inter-process communication VM IPC client, the information used to indicate to display the third interface: send, to the hypervisor based on the system kernel of the first TEE, the information used to indicate to display the third interface: send, to the TUI server end based on the hypervisor, the information used to indicate to display the third interface; and call, based on the TUI server end, the TUI display driver to display the third interface.

In a possible implementation, the processing unit is specifically configured to: display a fifth interface, where the fifth interface is an interface after the first application is opened, and the fifth interface includes a third control; and obtain the first display request when the terminal device receives a trigger for the third control.

In a possible implementation, the information processing apparatus may further include a storage unit 903. The processing unit 901, the display unit 902, and the storage unit 903 are connected through a communication bus.

The storage unit 903 may include one or more memories. The memory may be one or more devices, circuits, or components configured to store a program.

The storage unit 903 may exist alone, or may be connected to the processing unit 901 of the information processing apparatus through the communication bus. The storage unit 903 may also be integrated into the processing unit 901.

The information processing apparatus can be used in an information processing device, a circuit, a hardware component, or a chip.

Figure 10:
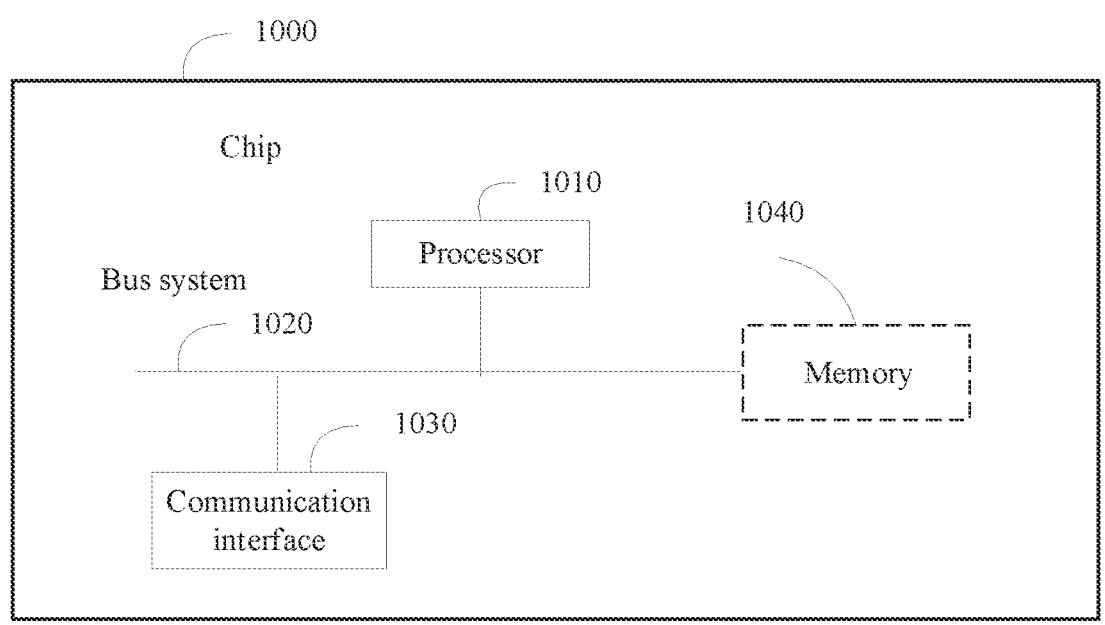
FIG. 10 is a schematic diagram of a structure of a chip according to an embodiment of the present application.

For example, FIG. 10 is a schematic diagram of a structure of a chip according to an embodiment of the present application. A chip 1000 includes one or two or more (including two) processors 1010 and a communication interface 1030.

In some implementations, the memory 1040 stores the following elements: an executable module or a data structure, or subsets thereof, or extended sets thereof.

In this embodiment of this application, the memory 1040 may include a read-only memory and a random access memory, and provides instructions and data to the processor 1010. A part of the memory 1040 may further include a non-volatile random access memory (NVRAM).

In this embodiment of this application, the memory 1040, the communication interface 1030, and the memory 1040 are coupled through a bus system 1020. The bus system 1020 may further include a power bus, a control bus, and a status signal bus in addition to a data bus. For convenience of description, various buses are marked as the bus system 1020 in FIG. 10.

The methods described in the foregoing embodiments of this application may be applied to the processor 1010 or implemented by the processor 1010. The processor 1010 may be an integrated circuit chip, and has a signal processing capability. During implementation, the steps of the foregoing method can be completed by hardware integrated logic circuits in the processor 1010 or instructions in the form of software. The foregoing processor 1010 may be a general purpose processor (for example, a microprocessor or a conventional processor), a digital signal processor (DSP), an application specific integrated circuit (ASIC), a field-programmable gate array (FPGA) or another programmable logic device, a discrete gate, a transistor logic device, or a discrete hardware component. The processor 1010 can implement or execute the methods, steps, and logical block diagrams disclosed in the embodiments of the present disclosure.

Steps of the methods with reference to the embodiments of this application may be directly performed and completed by using a hardware decoding processor, or may be performed and completed by using a combination of hardware and a software module in a decoding processor. The software module may be located in a storage medium mature in the art, such as a random access memory, a read-only memory, a programmable read-only memory, or an electrically erasable programmable read only memory (EEPROM). The storage medium is located in the memory 1040, and the processor 1010 reads information in the memory 1040, and completes the steps of the foregoing method in combination with hardware of the processor.

In the foregoing embodiment, the instructions stored in the memory and executed by the processor may be implemented in a form of a computer program product. The computer program product may be written into the memory in advance, or may be downloaded to and installed in the memory in a form of software.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any available medium accessible by a computer, or a data storage device such as a server or a data center, integrating one or more available media. The available medium may include a magnetic medium (for example, a floppy disk, a hard disk, or a magnetic tape), an optical medium (for example, a digital versatile disc (DVD)), a semi-conductive medium (for example, a solid state disk (SSD)), or the like.

An embodiment of this application further provides a computer-readable storage medium. The method described in the foregoing embodiments may be fully or partially implemented by software, hardware, firmware, or any combination thereof. The computer readable medium may include a computer storage medium and a communications medium, and may further include any medium that can transmit a computer program from one place to another. The storage medium may be any target medium accessible to a computer.

As a possible design, the computer-readable medium may include a compact disc read-only memory (CD-ROM), a RAM, a ROM, an EEPROM or other disc storage. The computer-readable medium may include magnetic disk storage or other magnetic disk storage devices. In addition, any connection line may also be appropriately referred to as a computer-readable medium. For example, if software is transmitted from a website, a server or another remote source by using a coaxial cable, an optical fiber cable, a twisted pair, a DSL or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc (CD), a laser disc, an optical disc, a digital versatile disc (DVD), a floppy disk, and a blue ray disc, where the magnetic disk generally reproduces data in a magnetic manner, and the optical disc reproduces data optically by using laser.

The foregoing combinations should also be included in the scope of a computer-readable medium. The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information processing method, comprising:
   obtaining, by a terminal device, a first display request based on a first trusted user interface (TUI) trusted application, wherein a rich execution environment (REE) and at least two trusted execution environments (TEEs) are deployed in the terminal device, wherein the REE comprises one or more applications, wherein the first display request is used to display a first interface, wherein the first display request comprises display information of the first interface, wherein the first TUI trusted application is run in a first TEE, wherein the first TEE is a TEE in the at least two TEEs, and wherein a first TUI framework is run in the first TEE;
   drawing, by the terminal device, the first interface based on the first TUI framework;
   obtaining, by the terminal device from the first TUI framework based on a TUI server end, information used to indicate to display the first interface, wherein the TUI server end is run in a second TEE, wherein the second TEE is a TEE in the at least two TEEs, and wherein a TUI display driver is integrated in the second TEE; and
   calling, by the terminal device based on the TUI server end, the TUI display driver to display the first interface.

2. The method according to claim 1, wherein a TUI input driver is further integrated in the second TEE, the first interface comprises an input component, and the method further comprises:
   based on the terminal device receiving a trigger for the input component in the first interface based on the TUI server end, obtaining, by the terminal device, first security information based on the TUI server end, wherein the first security information is obtained by calling the TUI input driver by the TUI server end, the first security information is information that is input based on the input component, and the first security information comprises an account password and a payment password;

obtaining, by the terminal device, the first security information from the TUI server end based on the first TUI trusted application;

sending, by the terminal device, the first security information to a first server based on the first TUI trusted application, wherein the first server is configured to serve a first application, wherein the first application is any one of the one or more applications comprised in the REE;

based on the first server determining that the first security information matches with preset security information, obtaining, by the terminal device based on the first application, information indicating successful matching from the first server; and displaying, by the terminal device, a second interface based on the first application.

3. The method according to claim 2, wherein the obtaining, by the terminal device, the first security information from the TUI server end based on the first TUI trusted application comprises:

sending, by the terminal device, the first security information to a hypervisor based on the TUI server end;

sending, by the terminal device, the first security information to a system kernel of the first TEE based on the hypervisor;

sending, by the terminal device, the first security information to a virtual machine inter-process communication (VM IPC) client based on the system kernel of the first TEE;

sending, by the terminal device, the first security information to the first TUI framework based on the VM IPC client;

based on the terminal device calling a TUI application programming interface (API), sending, by the terminal device, the first security information to the first TUI trusted application based on the first TUI framework; and obtaining, by the terminal device, the first security information based on the first TUI trusted application.

4. The method according to claim 1, wherein a first application is any one of the one or more applications comprised in the REE, and wherein the obtaining, by the terminal device, the first display request based on the first TUI trusted application comprises:

sending, by the terminal device, the first display request to a system kernel of the REE based on the first application;

sending, by the terminal device, the first display request to a hypervisor based on the system kernel of the REE;

sending, by the terminal device, the first display request to the first TUI trusted application based on the hypervisor; and obtaining, by the terminal device, the first display request based on the first TUI trusted application.

5. The method according to claim 1, wherein the obtaining, by the terminal device, the first display request from based on the first TUI trusted application comprises:

based on the terminal device calling a TUI application programming interface (API), sending, by the terminal device, the first display request to the first TUI framework based on the first TUI trusted application; and obtaining, by the terminal device, the first display request based on the first TUI framework.

6. The method according to claim 1, wherein the obtaining, by the terminal device from the first TUI framework based on the TUI server end, the information used to indicate to display the first interface comprises:

sending, by the terminal device to a virtual machine inter-process communication (VM IPC) client based on the first TUI framework, the information used to indicate to display the first interface;

sending, by the terminal device to a system kernel of the first TEE based on the VM IPC client, the information used to indicate to display the first interface;

sending, by the terminal device to a hypervisor based on the system kernel of the first TEE, the information used to indicate to display the first interface;

sending, by the terminal device to the TUI server end based on the hypervisor, the information used to indicate to display the first interface; and obtaining, by the terminal device based on the TUI server end, the information used to indicate to display the first interface.

7. The method according to claim 1, wherein a first application is any one of the one or more applications comprised in the REE, and wherein the obtaining, by the terminal device, the first display request based on the first TUI trusted application comprises:

displaying, by the terminal device, a third interface, wherein the third interface is an interface in the first application, and the third interface comprises an input region; and obtaining, by the terminal device, the first display request based on the terminal device receiving a trigger for the input region in the third interface through the first application.

8. The method according to claim 7, wherein the displaying, by the terminal device, the third interface comprises:

displaying, by the terminal device, a fourth interface, wherein the fourth interface comprises a first control configured to open the first application;

obtaining, by the terminal device, a second display request based on the terminal device receiving a trigger for the first control in the fourth interface through the first application, wherein the second display request is used to display the third interface, and the second display request comprises display information of the third interface; and displaying, by the terminal device, the third interface based on the second display request.

9. The method according to claim 8, wherein the displaying, by the terminal device, the third interface based on the second display request comprises:

sending, by the terminal device, the second display request to a system kernel of the REE based on the first application;

sending, by the terminal device, the second display request to a hypervisor based on the system kernel of the REE;

sending, by the terminal device, the second display request to the first TUI trusted application based on the hypervisor;

based on the terminal device calling a TUI application programming interface (API), sending, by the terminal device, the second display request to the first TUI framework based on the first TUI trusted application;

drawing, by the terminal device, the third interface based on the first TUI framework;

sending, by the terminal device to a virtual machine inter-process communication (VM IPC) client based on the first TUI framework, information used to indicate to display the third interface;

sending, by the terminal device to the system kernel of the first TEE based on the VM IPC client, the information used to indicate to display the third interface;

sending, by the terminal device to the hypervisor based on the system kernel of the first TEE, the information used to indicate to display the third interface;

sending, by the terminal device to the TUI server end based on the hypervisor, the information used to indicate to display the third interface; and calling, by the terminal device based on the TUI server end, the TUI display driver to display the third interface.

10. A terminal device, comprising:

one or more processors; and a memory configured to store program code, wherein the one or more processors are configured to run the program code to enable the terminal device to implement operations comprising:

obtaining a first display request based on a first trusted user interface (TUI) trusted application, wherein a rich execution environment (REE) and at least two trusted execution environments (TEEs) are deployed in the terminal device, wherein the REE comprises one or more applications, wherein the first display request is used to display a first interface, wherein the first display request comprises display information of the first interface, wherein the first TUI trusted application is run in a first TEE, wherein the first TEE is a TEE in the at least two TEEs, and wherein a first TUI framework is run in the first TEE;

drawing the first interface based on the first TUI framework;

obtaining, from the first TUI framework based on a TUI server end, information used to indicate to display the first interface, wherein the TUI server end is run in a second TEE, wherein the second TEE is a TEE in the at least two TEEs, and wherein a TUI display driver is integrated in the second TEE; and calling, based on the TUI server end, the TUI display driver to display the first interface.

11. The terminal device according to claim 10, wherein a TUI input driver is further integrated in the second TEE, the first interface comprises an input component, and the terminal device is further to implement the following actions:

based on the terminal device receiving a trigger for the input component in the first interface based on the TUI server end, obtaining first security information based on the TUI server end, wherein the first security information is obtained by calling the TUI input driver by the TUI server end, the first security information is information that is input based on the input component, and the first security information comprises an account password and a payment password;

obtaining the first security information from the TUI server end based on the first TUI trusted application;

sending the first security information to a first server based on the first TUI trusted application, wherein the first server is configured to serve a first application, wherein the first application is any one of the one or more applications comprised in the REE;

based on the first server determining that the first security information matches with preset security information, obtaining, based on the first application, information indicating successful matching from the first server; and displaying a second interface based on the first application.

12. The terminal device according to claim 11, wherein the obtaining the first security information from the TUI server end based on the first TUI trusted application comprises:

sending the first security information to a hypervisor based on the TUI server end;

sending the first security information to a system kernel of the first TEE based on the hypervisor;

sending the first security information to a virtual machine inter-process communication (VM IPC) client based on the system kernel of the first TEE;

sending the first security information to the first TUI framework based on the VM IPC client;

based on the terminal device calling a TUI application programming interface (API), sending the first security information to the first TUI trusted application based on the first TUI framework; and obtaining the first security information based on the first TUI trusted application.

13. The terminal device according to claim 10, wherein a first application is any one of the one or more applications comprised in the REE, and wherein the obtaining the first display request based on the first TUI trusted application comprises:

sending the first display request to a system kernel of the REE based on the first application;

sending the first display request to a hypervisor based on the system kernel of the REE;

sending the first display request to the first TUI trusted application based on the hypervisor; and obtaining the first display request based on the first TUI trusted application.

14. The terminal device according to claim 10, wherein the obtaining the first display request based on the first TUI trusted application comprises:

based on the terminal device calling a TUI application programming interface (API), sending, the first display request to the first TUI framework based on the first TUI trusted application; and obtaining the first display request based on the first TUI framework.

15. The terminal device according to claim 10, wherein the obtaining, from the first TUI framework based on the TUI server end, the information used to indicate to display the first interface comprises:

sending, to a virtual machine inter-process communication (VM IPC) client based on the first TUI framework, the information used to indicate to display the first interface;

sending, to a system kernel of the first TEE based on the VM IPC client, the information used to indicate to display the first interface;

sending, to a hypervisor based on the system kernel of the first TEE, the information used to indicate to display the first interface;

sending, to the TUI server end based on the hypervisor, the information used to indicate to display the first interface; and obtaining, based on the TUI server end, the information used to indicate to display the first interface.

16. The terminal device according to claim 10, wherein a first application is any one of the one or more applications comprised in the REE, and wherein the obtaining the first display request based on the first TUI trusted application comprises:

displaying a third interface, wherein the third interface is an interface in the first application, and the third interface comprises an input region; and obtaining the first display request based on the terminal device receiving a trigger for the input region in the third interface through the first application.

17. The terminal device according to claim 16, wherein the displaying the third interface comprises:

displaying a fourth interface, wherein the fourth interface comprises a first control configured to open the first application;

obtaining a second display request based on the terminal device receiving a trigger for the first control in the fourth interface through the first application, wherein the second display request is used to display the third interface, and the second display request comprises display information of the third interface; and displaying the third interface based on the second display request.

18. The terminal device according to claim 17, wherein the displaying the third interface based on the second display request comprises:

sending the second display request to a system kernel of the REE based on the first application;

sending the second display request to a hypervisor based on the system kernel of the REE;

sending the second display request to the first TUI trusted application based on the hypervisor;

based on the terminal device calling a TUI application programming interface (API), sending the second display request to the first TUI framework based on the first TUI trusted application;

drawing the third interface based on the first TUI framework;

sending to a virtual machine inter-process communication (VM IPC) client based on the first TUI framework, information used to indicate to display the third interface;

sending to the system kernel of the first TEE based on the VM IPC client, the information used to indicate to display the third interface;

sending to the hypervisor based on the system kernel of the first TEE, the information used to indicate to display the third interface;

sending to the TUI server end based on the hypervisor, the information used to indicate to display the third interface; and calling device based on the TUI server end, the TUI display driver to display the third interface.

19. The terminal device according to claim 10, wherein a first application is any one of the one or more applications comprised in the REE, and wherein the obtaining the first display request based on the first TUI trusted application comprises:

displaying a fifth interface, wherein the fifth interface is an interface after the first application is opened, and the fifth interface comprises a third control; and obtaining the first display request based on the terminal device receiving a trigger for the third control.

20. A non-transitory computer-readable storage medium storing instructions that, when run on a terminal device, cause the terminal device to perform operations comprising:

obtaining a first display request based on a first trusted user interface (TUI) trusted application, wherein a rich execution environment (REE) and at least two trusted execution environments (TEEs) are deployed in the terminal device, wherein the REE comprises one or more applications, wherein the first display request is used to display a first interface, wherein the first display request comprises display information of the first interface, wherein the first TUI trusted application is run in a first TEE, wherein the first TEE is a TEE in the at least two TEEs, and wherein a first TUI framework is run in the first TEE;

drawing the first interface based on the first TUI framework;

obtaining, from the first TUI framework based on a TUI server end, information used to indicate to display the first interface, wherein the TUI server end is run in a second TEE, wherein the second TEE is a TEE in the at least two TEEs, and wherein a TUI display driver is integrated in the second TEE; and calling, based on the TUI server end, the TUI display driver to display the first interface.

\* \* \* \* \*